(12) United States Patent
Kim et al.

(10) Patent No.: US 8,786,809 B2
(45) Date of Patent: Jul. 22, 2014

(54) LIQUID CRYSTAL DISPLAY AND MANUFACTURING METHOD THEREOF

(75) Inventors: Kyoung Tae Kim, Osan-si (KR); Kyoung Ju Shin, Hwaseong-si (KR); Jun Woo Lee, Seongnam-si (KR); Suk Hoon Kang, Seoul (KR); Baek Kyun Jeon, Yongin-si (KR); Young-Gu Kim, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 314 days.

(21) Appl. No.: 13/277,348

(22) Filed: Oct. 20, 2011

(65) Prior Publication Data

US 2012/0320323 A1    Dec. 20, 2012

(30) Foreign Application Priority Data

Jun. 20, 2011   (KR) .................... 10-2011-0059834

(51) Int. Cl.
   *G02F 1/1337*   (2006.01)
(52) U.S. Cl.
   USPC ............................ 349/129; 349/128; 349/130

(58) Field of Classification Search
   CPC .............. G02F 1/133753; G02F 2001/133757; G02F 2001/133761
   USPC .......................................... 349/128, 129, 130
   See application file for complete search history.

(56) References Cited

U.S. PATENT DOCUMENTS

| | | | |
|---|---|---|---|
| 2007/0070008 A1* | 3/2007 | Shin et al. ........................ | 345/89 |
| 2010/0208183 A1* | 8/2010 | Kim ................................. | 349/124 |
| 2011/0085097 A1* | 4/2011 | Lee et al. ......................... | 349/33 |
| 2012/0236238 A1 | 9/2012 | Kim et al. | |

FOREIGN PATENT DOCUMENTS

| | | |
|---|---|---|
| KR | 1020110039899 A | 4/2011 |
| KR | 1020120012371 A | 2/2012 |
| KR | 1020120105722 A | 9/2012 |

* cited by examiner

*Primary Examiner* — Michael Caley
(74) *Attorney, Agent, or Firm* — Cantor Colburn LLP

(57) ABSTRACT

In a liquid crystal display, a pretilt value provided by an upper alignment layer or a lower alignment layer is gradually changed in one domain, such that liquid crystal molecules have various arrangements in which azimuth angles of aligned liquid crystal molecules are gradually changed.

15 Claims, 38 Drawing Sheets

FIG.2A
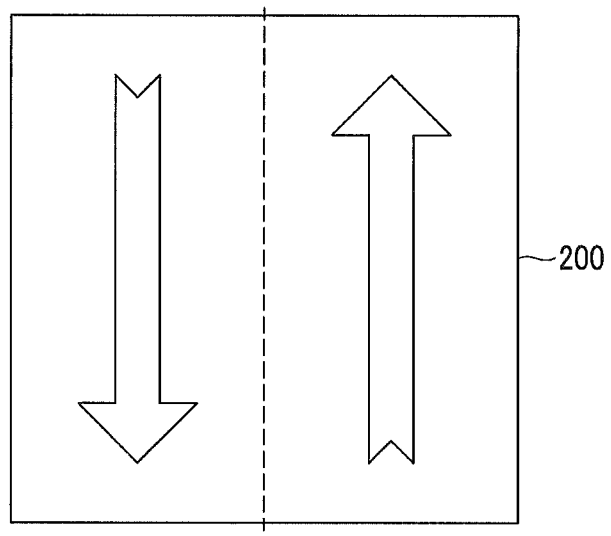
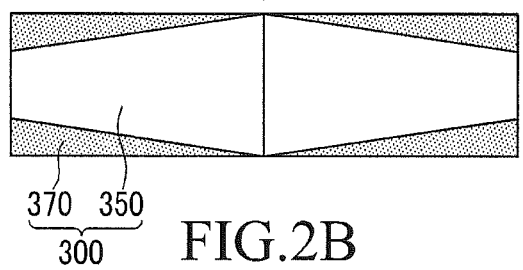
370 350
300
FIG.2B
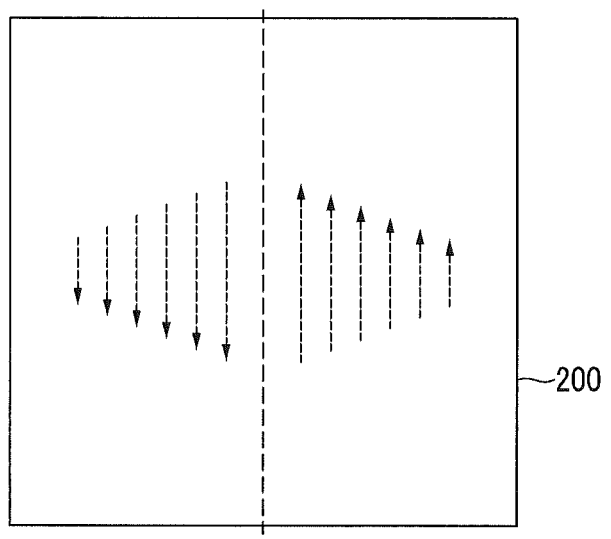

FIG.11

| delta pt | Right GDI |
|---|---|
| 0.00 | 0.305 |
| 0.30 | 0.292 |
| 0.50 | 0.281 |
| 0.69 | 0.275 |
| 0.74 | 0.264 |
| 0.96 | 0.235 |

| delta pt | Azimuthal |
|---|---|
| 0.00 | 0.00 |
| 0.15 | 2.00 |
| 0.30 | 3.75 |
| 0.45 | 6.00 |
| 0.70 | 9.20 |

| Azimuth Angle | T ratio for each Azi angle |
|---|---|
| 45 | 1.000 |
| 42 | 0.989 |
| 41 | 0.981 |
| 40 | 0.970 |
| 38 | 0.941 |
| 35 | 0.883 |

FIG.12

| Delta pretilt (Lower plate - upper plate) | Side visibility index | Azimuthal Angle movement | Ratio of transmittance |
|---|---|---|---|
| −1.000 | 0.380 | −13.040 | 0.824 |
| −0.900 | 0.367 | −11.760 | 0.849 |
| −0.800 | 0.354 | −10.480 | 0.873 |
| −0.700 | 0.337 | −9.200 | 0898 |
| −0.600 | 0.332 | −7.920 | 0.924 |
| −0.500 | 0.329 | −6.640 | 0.946 |
| −0.400 | 0.324 | −5.250 | 0.967 |
| −0.300 | 0.318 | −3.750 | 0.983 |
| −0.200 | 0.314 | −2.580 | 0.990 |
| −0.100 | 0.309 | −1.330 | 0.995 |
| 0.000 | 0.305 | 0.000 | 1.000 |
| 0.100 | 0.301 | 1.330 | 0.995 |
| 0.200 | 0.296 | 2.580 | 0.990 |
| 0.300 | 0.292 | 3.750 | 0.983 |
| 0.400 | 0.287 | 5.250 | 0.967 |
| 0.500 | 0.281 | 6.640 | 0.946 |
| 0.600 | 0.278 | 7.920 | 0.924 |
| 0.700 | 0.273 | 9.200 | 0.898 |
| 0.800 | 0.256 | 10.480 | 0.873 |
| 0.900 | 0.243 | 11.760 | 0.849 |
| 1.000 | 0.230 | 13.040 | 0.824 |
| 1.100 | 0.217 | 14.340 | 0.798 |
| 1.200 | 0.203 | 15.640 | 0.772 |
| 1.300 | 0.190 | 16.940 | 0.746 |
| 1.400 | 0.176 | 18.240 | 0.720 |

FIG.16

| | | Upper plate pretilt range | Lower plate pretilt range | Side visibility | Transmittance |
|---|---|---|---|---|---|
| Initial condition (Normal alignment) | | 1.8 Degrees | 1.8 Degrees | 0.305 | 100% |
| Gradual pretilt Application (When lower plate pretilt is large) | Condition1 | 1.4Degrees~2.2Degrees | 1.4Degrees~2.2Degrees | 0.305 | 97% |
| | Condition2 | 1.2Degrees~2.0Degrees | 1.4Degrees~2.2Degrees | 0.294 | 96% |
| | Condition3 | 1.0Degrees~1.8Degrees | 1.4Degrees~2.2Degrees | 0.281 | 94% |
| | Condition4 | 0.8Degrees~1.6Degrees | 1.4Degrees~2.2Degrees | 0.266 | 91% |
| Gradual pretilt Application (When upper plate pretilt is large) | Condition5 | 1.4Degrees~2.2Degrees | 1.2Degrees~2.0Degrees | 0.316 | 96% |
| | Condition6 | 1.4Degrees~2.2Degrees | 1.0Degrees~1.8Degrees | 0.329 | 94% |
| | Condition7 | 1.4Degrees~2.2Degrees | 0.8Degrees~1.6Degrees | 0.344 | 91% |
| Comparative Example | Condition8 | 1.6Degrees | 1.8Degrees | 0.296 | 99% |
| | Condition9 | 1.6Degrees | 2.1Degrees | 0.281 | 94% |
| | Condition10 | 1.4Degrees | 2.2Degrees | 0.256 | 87% |

FIG. 18

| 1.4/1.4 (0) 0.305 (1.000) | 1.6/1.4 (-0.2) 0.314 (0.990) | 1.8/1.4 (-0.4) 0.324 (0.967) | 2.0/1.4 (-0.6) 0.332 (0.924) | 2.2/1.4 (-0.8) 0.354 (0.873) | 2.0/1.4 (-0.6) 0.332 (0.924) | 1.8/1.4 (-0.4) 0.324 (0.967) | 1.6/1.4 (-0.2) 0.314 (0.990) | 1.4/1.4 (0) 0.305 (1.000) |
| 1.4/1.6 (0.2) 0.296 (0.990) | 1.6/1.6 (0) 0.305 (1.000) | 1.8/1.6 (-0.2) 0.314 (0.990) | 2.0/1.6 (-0.4) 0.324 (0.967) | 2.2/1.6 (-0.6) 0.332 (0.924) | 2.0/1.6 (-0.4) 0.324 (0.967) | 1.8/1.6 (-0.2) 0.314 (0.990) | 1.6/1.6 (0) 0.305 (1.000) | 1.4/1.6 (0.2) 0.296 (0.990) |
| 1.4/1.8 (0.4) 0.287 (0.967) | 1.6/1.8 (0.2) 0.296 (0.990) | 1.8/1.8 (0) 0.305 (1.000) | 2.0/1.8 (-0.2) 0.314 (0.990) | 2.2/1.8 (-0.4) 0.324 (0.967) | 2.0/1.8 (-0.2) 0.314 (0.990) | 1.8/1.8 (0) 0.305 (1.000) | 1.6/1.8 (0.2) 0.296 (0.990) | 1.4/1.8 (0.4) 0.287 (0.967) |
| 1.4/2.0 (0.6) 0.278 (0.924) | 1.6/2.0 (0.4) 0.314 (0.990) | 1.8/2.0 (0.2) 0.296 (0.990) | 2.0/2.0 (0.0) 0.305 (1.000) | 2.2/2.0 (-0.2) 0.314 (0.990) | 2.0/2.0 (0.0) 0.305 (1.000) | 1.8/2.0 (0.2) 0.296 (0.990) | 1.6/2.0 (0.4) 0.314 (0.990) | 1.4/2.0 (0.6) 0.278 (0.924) |
| 1.4/2.2 (0.8) 0.256 (0.873) | 1.6/2.2 (0.6) 0.278 (0.924) | 1.8/2.2 (0.4) 0.287 (0.967) | 2.0/2.2 (0.2) 0.296 (0.990) | 2.2/2.2 (0.0) 0.305 (1.000) | 2.0/2.2 (0.2) 0.296 (0.990) | 1.8/2.2 (0.4) 0.287 (0.967) | 1.6/2.2 (0.6) 0.278 (0.924) | 1.4/2.2 (0.8) 0.256 (0.873) |
| 1.4/2.2 (0.8) 0.256 (0.873) | 1.6/2.2 (0.6) 0.278 (0.924) | 1.8/2.2 (0.4) 0.287 (0.967) | 2.0/2.2 (0.2) 0.296 (0.990) | 2.2/2.2 (0.0) 0.305 (1.000) | 2.0/2.2 (0.2) 0.296 (0.990) | 1.8/2.2 (0.4) 0.287 (0.967) | 1.6/2.2 (0.6) 0.278 (0.924) | 1.4/2.2 (0.8) 0.256 (0.873) |
| 1.4/2.0 (0.6) 0.278 (0.924) | 1.6/2.0 (0.4) 0.314 (0.990) | 1.8/2.0 (0.2) 0.296 (0.990) | 2.0/2.0 (0.0) 0.305 (1.000) | 2.2/2.0 (-0.2) 0.314 (0.990) | 2.0/2.0 (0.0) 0.305 (1.000) | 1.8/2.0 (0.2) 0.296 (0.990) | 1.6/2.0 (0.4) 0.314 (0.990) | 1.4/2.0 (0.6) 0.278 (0.924) |
| 1.4/1.8 (0.4) 0.287 (0.967) | 1.6/1.8 (0.2) 0.296 (0.990) | 1.8/1.8 (0) 0.305 (1.000) | 2.0/1.8 (-0.2) 0.314 (0.990) | 2.2/1.8 (-0.4) 0.324 (0.967) | 2.0/1.8 (-0.2) 0.314 (0.990) | 1.8/1.8 (0) 0.305 (1.000) | 1.6/1.8 (0.2) 0.296 (0.990) | 1.4/1.8 (0.4) 0.287 (0.967) |
| 1.4/1.6 (0.2) 0.296 (0.990) | 1.6/1.6 (0) 0.305 (1.000) | 1.8/1.6 (-0.2) 0.314 (0.990) | 2.0/1.6 (-0.4) 0.324 (0.967) | 2.2/1.6 (-0.6) 0.332 (0.924) | 2.0/1.6 (-0.4) 0.324 (0.967) | 1.8/1.6 (-0.2) 0.314 (0.990) | 1.6/1.6 (0) 0.305 (1.000) | 1.4/1.6 (0.2) 0.296 (0.990) |
| 1.4/1.4 (0) 0.305 (1.000) | 1.6/1.4 (-0.2) 0.314 (0.990) | 1.8/1.4 (-0.4) 0.324 (0.967) | 2.0/1.4 (-0.6) 0.332 (0.924) | 2.2/1.4 (-0.8) 0.354 (0.873) | 2.0/1.4 (-0.6) 0.332 (0.924) | 1.8/1.4 (-0.4) 0.324 (0.967) | 1.6/1.4 (-0.2) 0.314 (0.990) | 1.4/1.4 (0) 0.305 (1.000) |

FIG.19

| 1.2/1.4 (0.2) 0.296 (0.990) | 1.4/1.4 (0.0) 0.305 (1.000) | 1.6/1.4 (-0.2) 0.314 (0.990) | 1.8/1.4 (-0.4) 0.324 (0.967) | 2.0/1.4 (-0.6) 0.332 (0.924) | 1.8/1.4 (-0.4) 0.324 (0.967) | 1.6/1.4 (-0.2) 0.314 (0.990) | 1.4/1.4 (0.0) 0.305 (1.000) | 1.2/1.4 (0.2) 0.296 (0.990) |
| --- | --- | --- | --- | --- | --- | --- | --- | --- |
| 1.2/1.6 (0.4) 0.287 (0.967) | 1.4/1.6 (0.2) 0.296 (0.990) | 1.6/1.6 (0.0) 0.305 (1.000) | 1.8/1.6 (-0.2) 0.314 (0.990) | 2.0/1.6 (-0.4) 0.324 (0.967) | 1.8/1.6 (-0.2) 0.314 (0.990) | 1.6/1.6 (0.0) 0.305 (1.000) | 1.4/1.6 (0.2) 0.296 (0.990) | 1.2/1.6 (0.4) 0.287 (0.967) |
| 1.2/1.8 (0.6) 0.278 (0.924) | 1.4/1.8 (0.4) 0.287 (0.967) | 1.6/1.8 (0.2) 0.296 (0.990) | 1.8/1.8 (0.0) 0.305 (1.000) | 2.0/1.8 (-0.2) 0.314 (0.990) | 1.8/1.8 (0.0) 0.305 (1.000) | 1.6/1.8 (0.2) 0.296 (0.990) | 1.4/1.8 (0.4) 0.287 (0.967) | 1.2/1.8 (0.6) 0.278 (0.924) |
| 1.2/2.0 (0.8) 0.256 (0.873) | 1.4/2.0 (0.6) 0.278 (0.924) | 1.6/2.0 (0.4) 0.287 (0.967) | 1.8/2.0 (0.2) 0.296 (0.990) | 2.0/2.0 (0.0) 0.305 (1.000) | 1.8/2.0 (0.2) 0.296 (0.990) | 1.6/2.0 (0.4) 0.287 (0.967) | 1.4/2.0 (0.6) 0.278 (0.924) | 1.2/2.0 (0.8) 0.256 (0.873) |
| 1.2/2.2 (1.0) 0.230 (0.824) | 1.4/2.2 (0.8) 0.256 (0.873) | 1.6/2.2 (0.6) 0.278 (0.924) | 1.8/2.2 (0.4) 0.287 (0.967) | 2.0/2.2 (0.2) 0.296 (0.990) | 1.8/2.2 (0.4) 0.287 (0.967) | 1.6/2.2 (0.6) 0.278 (0.924) | 1.4/2.2 (0.8) 0.256 (0.873) | 1.2/2.2 (1.0) 0.230 (0.824) |
| 1.2/2.2 (1.0) 0.230 (0.824) | 1.4/2.2 (0.8) 0.256 (0.873) | 1.6/2.2 (0.6) 0.278 (0.924) | 1.8/2.2 (0.4) 0.287 (0.967) | 2.0/2.2 (0.2) 0.296 (0.990) | 1.8/2.2 (0.4) 0.287 (0.967) | 1.6/2.2 (0.6) 0.278 (0.924) | 1.4/2.2 (0.8) 0.256 (0.873) | 1.2/2.2 (1.0) 0.230 (0.824) |
| 1.2/2.0 (0.8) 0.256 (0.873) | 1.4/2.0 (0.6) 0.278 (0.924) | 1.6/2.0 (0.4) 0.287 (0.967) | 1.8/2.0 (0.2) 0.296 (0.990) | 2.0/2.0 (0.0) 0.305 (1.000) | 1.8/2.0 (0.2) 0.296 (0.990) | 1.6/2.0 (0.4) 0.287 (0.967) | 1.4/2.0 (0.6) 0.278 (0.924) | 1.2/2.0 (0.8) 0.256 (0.873) |
| 1.2/1.8 (0.6) 0.278 (0.924) | 1.4/1.8 (0.4) 0.287 (0.967) | 1.6/1.8 (0.2) 0.296 (0.990) | 1.8/1.8 (0.0) 0.305 (1.000) | 2.0/1.8 (-0.2) 0.314 (0.990) | 1.8/1.8 (0.0) 0.305 (1.000) | 1.6/1.8 (0.2) 0.296 (0.990) | 1.4/1.8 (0.4) 0.287 (0.967) | 1.2/1.8 (0.6) 0.278 (0.924) |
| 1.2/1.6 (0.4) 0.287 (0.967) | 1.4/1.6 (0.2) 0.296 (0.990) | 1.6/1.6 (0.0) 0.305 (1.000) | 1.8/1.6 (-0.2) 0.314 (0.990) | 2.0/1.6 (-0.4) 0.324 (0.967) | 1.8/1.6 (-0.2) 0.314 (0.990) | 1.6/1.6 (0.0) 0.305 (1.000) | 1.4/1.6 (0.2) 0.296 (0.990) | 1.2/1.6 (0.4) 0.287 (0.967) |
| 1.2/1.4 (0.2) 0.296 (0.990) | 1.4/1.4 (0.0) 0.305 (1.000) | 1.6/1.4 (-0.2) 0.314 (0.990) | 1.8/1.4 (-0.4) 0.324 (0.967) | 2.0/1.4 (-0.6) 0.332 (0.924) | 1.8/1.4 (-0.4) 0.324 (0.967) | 1.6/1.4 (-0.2) 0.314 (0.990) | 1.4/1.4 (0.0) 0.305 (1.000) | 1.2/1.4 (0.2) 0.296 (0.990) |

FIG.20

| 1.0/1.4 (0.4)<br>0.287 (0.967) | 1.2/1.4 (0.2)<br>0.296 (0.990) | 1.4/1.4 (0.0)<br>0.305 (1.000) | 1.6/1.4 (-0.2)<br>0.314 (0.990) | 1.8/1.4 (-0.4)<br>0.324 (0.967) | 1.8/1.4 (-0.4)<br>0.324 (0.967) | 1.6/1.4 (-0.2)<br>0.314 (0.990) | 1.4/1.4 (0.0)<br>0.305 (1.000) | 1.2/1.4 (0.2)<br>0.296 (0.990) | 1.0/1.4 (0.4)<br>0.287 (0.967) |
|---|---|---|---|---|---|---|---|---|---|
| 1.0/1.6 (0.6)<br>0.278 (0.924) | 1.2/1.6 (0.4)<br>0.287 (0.967) | 1.4/1.6 (0.2)<br>0.296 (0.990) | 1.6/1.6 (0.0)<br>0.305 (1.000) | 1.8/1.6 (-0.2)<br>0.314 (0.990) | 1.8/1.6 (-0.2)<br>0.314 (0.990) | 1.6/1.6 (0.0)<br>0.305 (1.000) | 1.4/1.6 (0.2)<br>0.296 (0.990) | 1.2/1.6 (0.4)<br>0.287 (0.967) | 1.0/1.6 (0.6)<br>0.278 (0.924) |
| 1.0/1.8 (0.8)<br>0.256 (0.873) | 1.2/1.8 (0.6)<br>0.278 (0.924) | 1.4/1.8 (0.4)<br>0.287 (0.967) | 1.6/1.8 (0.2)<br>0.296 (0.990) | 1.8/1.8 (0.0)<br>0.305 (1.000) | 1.8/1.8 (0.0)<br>0.305 (1.000) | 1.6/1.8 (0.2)<br>0.296 (0.990) | 1.4/1.8 (0.4)<br>0.287 (0.967) | 1.2/1.8 (0.6)<br>0.278 (0.924) | 1.0/1.8 (0.8)<br>0.256 (0.873) |
| 1.0/2.0 (1.0)<br>0.230 (0.824) | 1.2/2.0 (0.8)<br>0.256 (0.873) | 1.4/2.0 (0.6)<br>0.278 (0.924) | 1.6/2.0 (0.4)<br>0.287 (0.967) | 1.8/2.0 (0.2)<br>0.296 (0.990) | 1.8/2.0 (0.2)<br>0.296 (0.990) | 1.6/2.0 (0.4)<br>0.287 (0.967) | 1.4/2.0 (0.6)<br>0.278 (0.924) | 1.2/2.0 (0.8)<br>0.256 (0.873) | 1.0/2.0 (1.0)<br>0.230 (0.824) |
| 1.0/2.2 (1.2)<br>0.203 (0.772) | 1.2/2.2 (1.0)<br>0.230 (0.824) | 1.4/2.2 (0.8)<br>0.256 (0.873) | 1.6/2.2 (0.6)<br>0.278 (0.924) | 1.8/2.2 (0.4)<br>0.287 (0.967) | 1.8/2.2 (0.4)<br>0.287 (0.967) | 1.6/2.2 (0.6)<br>0.278 (0.924) | 1.4/2.2 (0.8)<br>0.256 (0.873) | 1.2/2.2 (1.0)<br>0.230 (0.824) | 1.0/2.2 (1.2)<br>0.203 (0.772) |
| 1.0/2.2 (1.2)<br>0.203 (0.772) | 1.2/2.2 (1.0)<br>0.230 (0.824) | 1.4/2.2 (0.8)<br>0.256 (0.873) | 1.6/2.2 (0.6)<br>0.278 (0.924) | 1.8/2.2 (0.4)<br>0.287 (0.967) | 1.8/2.2 (0.4)<br>0.287 (0.967) | 1.6/2.2 (0.6)<br>0.278 (0.924) | 1.4/2.2 (0.8)<br>0.256 (0.873) | 1.2/2.2 (1.0)<br>0.230 (0.824) | 1.0/2.2 (1.2)<br>0.203 (0.772) |
| 1.0/2.0 (1.0)<br>0.230 (0.824) | 1.2/2.0 (0.8)<br>0.256 (0.873) | 1.4/2.0 (0.6)<br>0.278 (0.924) | 1.6/2.0 (0.4)<br>0.287 (0.967) | 1.8/2.0 (0.2)<br>0.296 (0.990) | 1.8/2.0 (0.2)<br>0.296 (0.990) | 1.6/2.0 (0.4)<br>0.287 (0.967) | 1.4/2.0 (0.6)<br>0.278 (0.924) | 1.2/2.0 (0.8)<br>0.256 (0.873) | 1.0/2.0 (1.0)<br>0.230 (0.824) |
| 1.0/1.8 (0.8)<br>0.256 (0.873) | 1.2/1.8 (0.6)<br>0.278 (0.924) | 1.4/1.8 (0.4)<br>0.287 (0.967) | 1.6/1.8 (0.2)<br>0.296 (0.990) | 1.8/1.8 (0.0)<br>0.305 (1.000) | 1.8/1.8 (0.0)<br>0.305 (1.000) | 1.6/1.8 (0.2)<br>0.296 (0.990) | 1.4/1.8 (0.4)<br>0.287 (0.967) | 1.2/1.8 (0.6)<br>0.278 (0.924) | 1.0/1.8 (0.8)<br>0.256 (0.873) |
| 1.0/1.6 (0.6)<br>0.278 (0.924) | 1.2/1.6 (0.4)<br>0.287 (0.967) | 1.4/1.6 (0.2)<br>0.296 (0.990) | 1.6/1.6 (0.0)<br>0.305 (1.000) | 1.8/1.6 (-0.2)<br>0.314 (0.990) | 1.8/1.6 (-0.2)<br>0.314 (0.990) | 1.6/1.6 (0.0)<br>0.305 (1.000) | 1.4/1.6 (0.2)<br>0.296 (0.990) | 1.2/1.6 (0.4)<br>0.287 (0.967) | 1.0/1.6 (0.6)<br>0.278 (0.924) |
| 1.0/1.4 (0.4)<br>0.287 (0.967) | 1.2/1.4 (0.2)<br>0.296 (0.990) | 1.4/1.4 (0.0)<br>0.305 (1.000) | 1.6/1.4 (-0.2)<br>0.314 (0.990) | 1.8/1.4 (-0.4)<br>0.324 (0.967) | 1.8/1.4 (-0.4)<br>0.324 (0.967) | 1.6/1.4 (-0.2)<br>0.314 (0.990) | 1.4/1.4 (0.0)<br>0.305 (1.000) | 1.2/1.4 (0.2)<br>0.296 (0.990) | 1.0/1.4 (0.4)<br>0.287 (0.967) |

FIG.21

| 0.8/1.4 (0.6)<br>0.278 (0.924) | 1.0/1.4 (0.4)<br>0.287 (0.967) | 1.2/1.4 (0.2)<br>0.296 (0.990) | 1.4/1.4 (0.0)<br>0.305 (1.000) | 1.6/1.4 (-0.2)<br>0.314 (0.990) | 1.4/1.4 (0.0)<br>0.305 (1.000) | 1.2/1.4 (0.2)<br>0.296 (0.990) | 1.0/1.4 (0.4)<br>0.287 (0.967) | 0.8/1.4 (0.6)<br>0.278 (0.924) |
|---|---|---|---|---|---|---|---|---|
| 0.8/1.6 (0.8)<br>0.256 (0.873) | 1.0/1.6 (0.6)<br>0.278 (0.924) | 1.2/1.6 (0.4)<br>0.287 (0.967) | 1.4/1.6 (0.2)<br>0.296 (0.990) | 1.6/1/6 (0.0)<br>0.305 (1.000) | 1.4/1.6 (0.2)<br>0.296 (0.990) | 1.2/1.6 (0.4)<br>0.287 (0.967) | 1.0/1.6 (0.6)<br>0.278 (0.924) | 0.8/1.6 (0.8)<br>0.256 (0.873) |
| 0.8/1.8 (1.0)<br>0.230 (0.824) | 1.0/1.8 (0.8)<br>0.256 (0.873) | 1.2/1.8 (0.6)<br>0.278 (0.924) | 1.4/1.8 (0.4)<br>0.287 (0.967) | 1.6/1.8 (0.2)<br>0.296 (0.990) | 1.4/1.8 (0.4)<br>0.287 (0.967) | 1.2/1.8 (0.6)<br>0.278 (0.924) | 1.0/1.8 (0.8)<br>0.256 (0.873) | 0.8/1.8 (1.0)<br>0.230 (0.824) |
| 0.8/2.0 (1.2)<br>0.203 (0.772) | 1.0/2.0 (1.0)<br>0.230 (0.824) | 1.2/1.8 (0.6)<br>0.278 (0.924) | 1.4/2.0 (0.6)<br>0.278 (0.924) | 1.6/2.0 (0.4)<br>0.287 (0.967) | 1.4/2.0 (0.6)<br>0.278 (0.924) | 1.2/2.0 (0.8)<br>0.256 (0.873) | 1.0/2.0 (1.0)<br>0.230 (0.824) | 0.8/2.0 (1.2)<br>0.203 (0.772) |
| 0.8/2.2 (1.4)<br>0.176 (0.720) | 1.0/2.2 (1.2)<br>0.203 (0.772) | 1.2/2.2 (1.0)<br>0.230 (0.824) | 1.4/2.2 (0.8)<br>0.256 (0.873) | 1.6/2.2 (0.6)<br>0.278 (0.924) | 1.4/2.2 (0.8)<br>0.256 (0.873) | 1.2/2.2 (1.0)<br>0.230 (0.824) | 1.0/2.2 (1.2)<br>0.203 (0.772) | 0.8/2.2 (1.4)<br>0.176 (0.720) |
| 0.8/2.2 (1.4)<br>0.176 (0.720) | 1.0/2.2 (1.2)<br>0.203 (0.772) | 1.2/2.2 (1.0)<br>0.230 (0.824) | 1.4/2.2 (0.8)<br>0.256 (0.873) | 1.6/2.2 (0.6)<br>0.278 (0.924) | 1.4/2.2 (0.8)<br>0.256 (0.873) | 1.2/2.2 (1.0)<br>0.230 (0.824) | 1.0/2.2 (1.2)<br>0.203 (0.772) | 0.8/2.2 (1.4)<br>0.176 (0.720) |
| 0.8/2.0 (1.2)<br>0.203 (0.772) | 1.0/2.0 (1.0)<br>0.230 (0.824) | 1.2/2.0 (0.8)<br>0.256 (0.873) | 1.4/2.0 (0.6)<br>0.278 (0.924) | 1.6/2.0 (0.4)<br>0.287 (0.967) | 1.4/2.0 (0.6)<br>0.278 (0.924) | 1.2/2.0 (0.8)<br>0.256 (0.873) | 1.0/2.0 (1.0)<br>0.230 (0.824) | 0.8/2.0 (1.2)<br>0.203 (0.772) |
| 0.8/1.8 (1.0)<br>0.230 (0.824) | 1.0/1.8 (0.8)<br>0.256 (0.873) | 1.2/1.8 (0.6)<br>0.278 (0.924) | 1.4/1.8 (0.4)<br>0.287 (0.967) | 1.6/1.8 (0.2)<br>0.296 (0.990) | 1.4/1.8 (0.4)<br>0.287 (0.967) | 1.2/1.8 (0.6)<br>0.278 (0.924) | 1.0/1.8 (0.8)<br>0.256 (0.873) | 0.8/1.8 (1.0)<br>0.230 (0.824) |
| 0.8/1.6 (0.8)<br>0.256 (0.873) | 1.0/1.6 (0.6)<br>0.278 (0.924) | 1.2/1.6 (0.4)<br>0.287 (0.967) | 1.4/1.6 (0.2)<br>0.296 (0.990) | 1.6/1/6 (0.0)<br>0.305 (1.000) | 1.4/1.6 (0.2)<br>0.296 (0.990) | 1.2/1.6 (0.4)<br>0.287 (0.967) | 1.0/1.6 (0.6)<br>0.278 (0.924) | 0.8/1.6 (0.8)<br>0.256 (0.873) |
| 0.8/1.4 (0.6)<br>0.278 (0.924) | 1.0/1.4 (0.4)<br>0.287 (0.967) | 1.2/1.4 (0.2)<br>0.296 (0.990) | 1.4/1.4 (0.0)<br>0.305 (1.000) | 1.6/1.4 (-0.2)<br>0.314 (0.990) | 1.4/1.4 (0.0)<br>0.305 (1.000) | 1.2/1.4 (0.2)<br>0.296 (0.990) | 1.0/1.4 (0.4)<br>0.287 (0.967) | 0.8/1.4 (0.6)<br>0.278 (0.924) |

LIQUID CRYSTAL DISPLAY AND MANUFACTURING METHOD THEREOF

This application claims priority to Korean Patent Application No. 10-2011-0059834 filed on Jun. 20, 2011, and all the benefits accruing therefrom under 35 U.S.C. §119, the entire contents of which are incorporated herein by reference.

BACKGROUND OF THE INVENTION (a) Field of the Invention

The invention relates to a liquid crystal display and a manufacturing method thereof, and more particularly, to a vertical alignment ("VA") mode liquid crystal display and a manufacturing method thereof.

(b) Description of the Related Art

A liquid crystal display panel, which is one of the more common types of flat panel displays, includes two sheets of substrates with field generating electrodes, and a liquid crystal layer interposed therebetween. The liquid crystal display generates electric fields in the liquid crystal layer by applying voltage to the field generating electrodes, determines the alignment of liquid crystal molecules of the liquid crystal layer by the generated electric field, and controls polarization of incident light, thereby displaying images.

Among the liquid crystal displays, a vertically alignment ("VA") mode liquid crystal display in which a long axis of the liquid crystal molecules is arranged to be perpendicular to upper and lower display panels in the state in which an electric field is not applied, has been in the limelight by having a high contrast ratio and easily implementing a wide reference viewing angle thereof.

In order to implement a wide viewing angle in the VA mode liquid crystal display, a plurality of domains having different alignment directions of the liquid crystals may be formed in one pixel. As such, there is a method of forming a cutout in the field generating electrode is a method of forming the plurality of domains in one pixel. In the method, the liquid crystal is aligned in a direction perpendicular to a fringe field by the fringe field formed between an edge of the cutout and the field generating electrode facing the edge of the cutout, thereby forming the plurality of domains.

However, in the structure, an aperture ratio is deteriorated and the liquid crystal disposed close to the cutout may be easily aligned in a direction perpendicular to the fringe field. However, in the liquid crystal disposed at the center which is far away from the cutout, random motion occurs such that a response speed is slow and a reverse-direction domain is formed such that a temporal afterimage is shown.

In the VA mode liquid crystal display, side visibility is deteriorated as compared with front visibility. In particular, in the case of a large display device such as a television and the like, in some cases, several persons may watch the display device together and in this case, since there are persons watching the display device at the right and left of the display screen, side visibility is more important with respect to display quality. Further, since the display quality may vary according to a viewing position even at the side of the display device, it has been important to have regular side visibility regardless of the position.

BRIEF SUMMARY OF THE INVENTION

The invention provides a vertical alignment ("VA") mode liquid crystal display having advantages of improving side visibility, and having regular side visibility according to a position and a manufacturing method thereof.

An exemplary embodiment of the invention provides a liquid crystal display including: a plurality of pixel regions each including a plurality of domains, a lower panel including a lower substrate, and a lower alignment layer on the lower substrate and including a pretilt; an upper panel including an upper substrate, and an upper alignment layer on the upper substrate and including a pretilt; and a VA mode liquid crystal layer between the lower panel and the upper panel and having a plurality of liquid crystal molecules. Liquid crystal molecules which are adjacent to the upper alignment layer or the lower alignment layer are arranged by a respective pretilt, and the pretilt of the lower alignment layer or the upper alignment layer is gradually changed in regions of one domain.

The liquid crystal molecules adjacent to the lower alignment layer may be arranged by a first pretilt in the one domain, the liquid crystal molecules adjacent to the upper alignment layer may be arranged by a second pretilt in the one domain, and the first pretilt may be changed within a first range and the second pretilt is changed within a second range.

The first range of the first pretilt and the second range of the second pretilt may be the same as each other.

Azimuth angle directions or first short-axis directions of the plurality of liquid crystal molecules in the one domain may be arranged in a curved line.

An azimuth angle of the plurality of liquid crystal molecules in the one domain may have a fan shape.

Azimuth angle directions or first short-axis directions of the liquid crystal molecules along the center of the fan shape may be arranged in a straight line.

The straight line may form an angle of 45 degrees with one side of the lower substrate or the upper substrate.

The first range of the first pretilt and the second range of the second pretilt may be different from each other.

Azimuth angle directions or first short-axis directions of the plurality of liquid crystal molecules in the one domain may be arranged in a curved line.

An azimuth angle of the plurality of liquid crystal molecules in the one domain may have a fan shape.

Azimuth angle directions or first short-axis directions of the liquid crystal molecules along the center of the fan shape may be arranged in a straight line.

The liquid crystal display may further include a pixel including a high gray display subpixel and a low gray display subpixel. The high gray display subpixel and the low gray display subpixel each may have four domains and the plurality of liquid crystal molecules adjacent to the lower alignment layer and the lower alignment layer in the four domains may be respectively arranged by the gradually changed pretilt.

Azimuth angle directions or first short-axis directions of the plurality of liquid crystal molecules in each of the domains may be arranged in a curved line.

An azimuth angle of the plurality of liquid crystal molecules in each of the domains may have a fan shape.

Azimuth angle directions or first short-axis directions of the liquid crystal molecule along the center of the fan shape may be arranged in a straight line.

Another exemplary embodiment of the invention provides a manufacturing method of a liquid crystal display, including: forming a lower alignment layer on a lower substrate; photo-aligning the lower alignment layer; forming an upper alignment layer on an upper substrate; photo-aligning the upper alignment layer; and bonding the upper substrate and the lower substrate and interposing a liquid crystal layer therebetween. The photo-aligning the lower alignment layer or the photo-aligning the upper alignment layer exposes the alignment layer by using a mask which gradually changes an exposure amount of the alignment layer.

The photo-aligning of the lower alignment layer may include dividing the lower substrate with respect to a first direction, and scan-exposing the lower substrate in the first direction and a direction diametrically opposed to the first direction. The photo-aligning the upper alignment layer may include dividing the upper substrate with respect to a second direction perpendicular to first direction, and scan-exposing the upper substrate in the second direction and a direction diametrically opposed to the second direction.

The mask may have a light transmitting region and a light shielding region, and a pattern of the light shielding region may include a linear function, an oblique line, a curved line, a stepwise shape, or the like.

The liquid crystal display may include a plurality of pixels. The photo-aligning the lower alignment layer may include first exposing a part of the lower substrate in one pixel once using one mask, and the photo-aligning the upper alignment layer may include second exposing a portion of the upper substrate in the pixel using the one mask.

At least a partial region of the mask may include a light semi-transmitting region which gradually increases in one direction of the mask.

According to exemplary embodiments of the invention, in a liquid crystal display, a pretilt value provided by an upper alignment layer or a lower alignment layer is gradually changed in one domain of one pixel, such that liquid crystal molecules have various arrangements in which azimuth angles of aligned liquid crystal molecules are gradually changed. Accordingly, grays are visible through an average value of the arrangements of the liquid crystal molecules in various directions at a side of the liquid crystal display, such that it is possible to have regular side visibility regardless of a position of a viewer relative to the liquid crystal display.

Further, components of a right and left direction (a horizontal direction) of the liquid crystal display are relatively increased in various arrangements of the liquid crystal molecules, thereby improving side visibility.

BRIEF DESCRIPTION OF THE DRAWINGS

The above and other features of the invention will become more apparent by describing in further detail exemplary embodiments thereof with reference to the accompanying drawings, in which:

FIGS. 2A and 2B are diagrams showing an exemplary embodiment of scan-exposing an upper substrate using a mask, according to the invention.

FIG. 11 is a result table of exemplary embodiments of actual measurements of an index of right side visibility, an azimuth angle, and transmittance depending on a difference between an upper pretilt and a lower pretilt, according to the invention.

FIG. 12 is a table of data expanded through interpolation and extrapolation based on the actual values of FIG. 11.

FIG. 16 is a table in which exemplary embodiments of side visibility and transmittance are calculated based on the actual results of FIG. 11, according to the case where an upper pretilt and a lower pretilt have predetermined ranges.

FIGS. 18 to 21 are tables showing data of an upper plate pretilt, a lower plate pretilt, a difference in pretilts of upper and lower plates, right side visibility, and transmittance as one table with respect to conditions 1 to 4 of FIG. 16.

DETAILED DESCRIPTION OF THE INVENTION

Figure 1A:
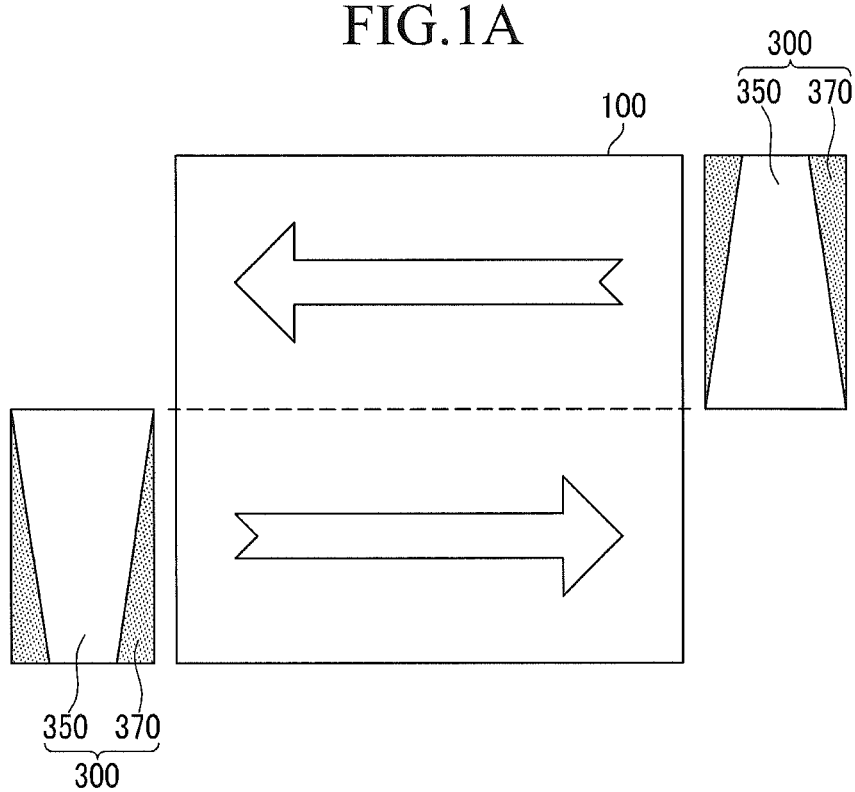
FIGS. 1A and 1B are diagrams showing an exemplary embodiment of scan-exposing a lower substrate using a mask, according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Hereinafter, an exemplary embodiment of a liquid crystal display and an alignment method thereof, according to the invention will be described in detail with reference to FIGS. 1A to 8.

Figure 1B:
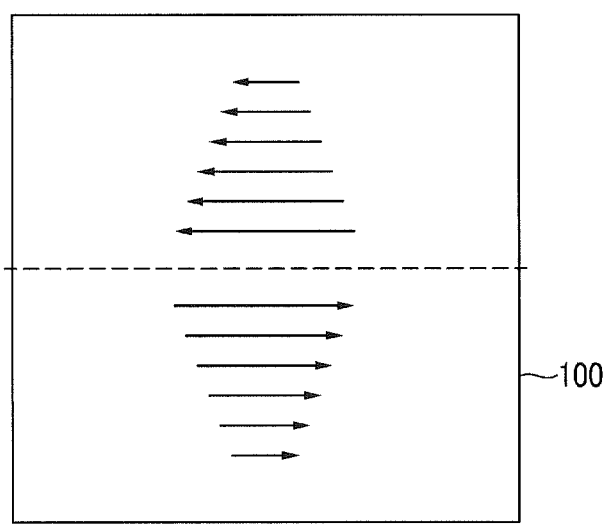
Figure 3:
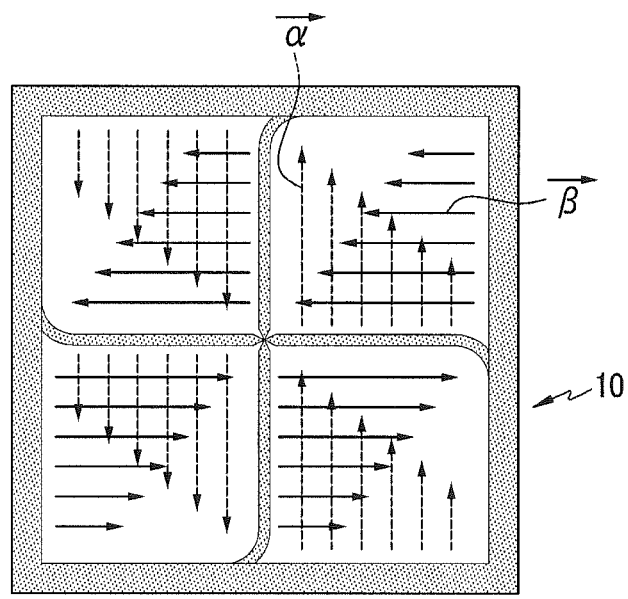
FIG. 3 is a diagram showing an exemplary embodiment of an upper pretilt and a lower pretilt of a liquid crystal display, according to the invention.
Figure 4:
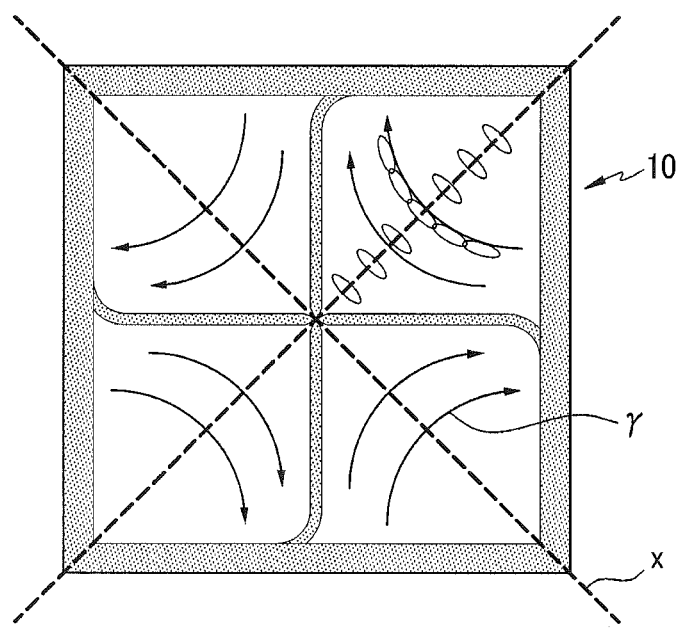
FIG. 4 is a diagram showing an exemplary embodiment of liquid crystal azimuth angles of a liquid crystal display as arrows, according to the invention.

FIGS. 1A and 1B are diagrams showing an exemplary embodiment of scan-exposing a lower substrate using a mask according to the invention, FIGS. 2A and 2B are diagrams showing an exemplary embodiment of scan-exposing an upper substrate using a mask according to the invention, FIG. 3 is a diagram showing an exemplary embodiment of an upper pretilt and a lower pretilt of a liquid crystal display according to the invention, FIG. 4 is a diagram showing an exemplary embodiment of liquid crystal azimuth angles of a liquid crystal display as arrows according to the invention, and FIGS. 5 to 8 are diagrams showing exemplary embodiment of a pretilt and an azimuth angle of a liquid crystal molecule according to the invention.

FIGS. 1A and 1B show forming a lower pretilt through a scan-exposure using a mask 300 in a lower panel 100. A big arrow indicated in FIG. 1A shows a direction in which the scan-exposure is performed.

Figure 5:
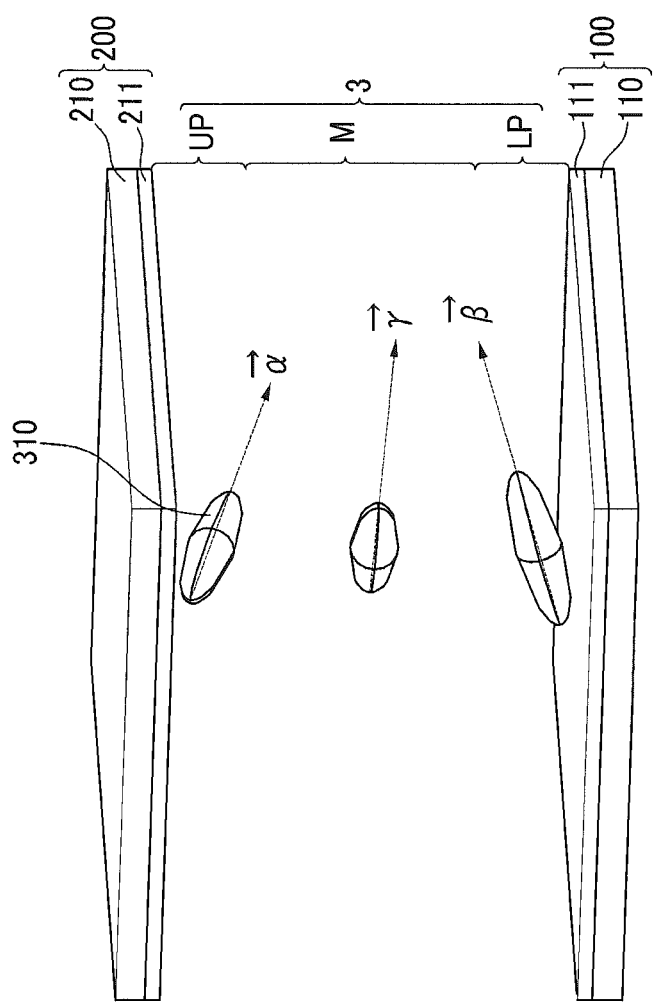
FIGS. 5 to 8 are diagrams showing exemplary embodiments of a pretilt and an azimuth angle of a liquid crystal molecule, according to the invention.

The lower panel 100 has an alignment layer (not shown because of a plan view; see reference numeral 111 of FIG. 5), and a photo-alignment including exposure is performed on the alignment layer, which forms the pretilt of the alignment layer. The pretilt positions (e.g., lays) liquid crystal molecules adjacent to the alignment layer in a predetermined direction and a pretilt value represents an angle of a line perpendicular to a substrate. (Referring to FIGS. 6 and 7)

FIG. 1A shows dividing the lower panel 100 into upper and lower regions, and scan-exposing the mask 300 or the lower panel 100 while the mask 300 or the lower panel 100 moves in right and left scan directions. First, the mask 300 used in the upper region includes a light shielding region 370 and a light transmitting region 350. The light shielding region 370 has a structure in which a size thereof gradually widens in an upwards direction in a plan view, and the light transmitting region 350 has a structure in which a size thereof gradually narrows in the upwards direction of the plan view. When the upper region is scan-exposed by using the mask 300, the pretilt is formed in the alignment layer as shown in the upper region of FIG. 1B as an arrow.

A size (e.g., a length) of the arrow in FIG. 1B represents a size of the pretilt and when the size of the pretilt is large, the pretilt lies at a larger angle. In FIG. 1B, the size of the pretilt is small in an upper side which is slightly exposed by the narrow area of the light transmitting region 350 of the mask 300, and the size of the pretilt is large in a lower side which is largely exposed, by the wide area of the light transmitting region 350 of the mask 300, such that the pretilt value between the upper side and the lower side is gradually changed.

The mask 300 used in the lower region of the lower panel 100 has a structure in which the light shielding region 370 gradually widens in a downwards direction in the plan view, unlike the mask 300 used in upper region. As a result, as shown by the sizes of the arrows in the lower region of FIG. 1B, the size of the pretilt of the alignment layer is large in the upper side which is largely exposed by the wide area of the light transmitting region 350, and the size of the pretilt is small in the lower side which is slightly exposed by the narrow area of the light transmitting region 350, such that the pretilt value between the upper side and the lower side is gradually changed.

The lower panel 100 shown in FIGS. 1A and 1B represents one pixel, or represents a subpixel which is a part of one pixel. Even in another portion of the lower panel 100, the pretilt due to the photo-alignment is formed through a horizontal scan.

Hereinafter, a pretilt due to a scan exposure of an upper panel 200 will be described with reference to FIGS. 2A and 2B.

FIGS. 2A and 2B show forming an upper pretilt through a scan-exposure using a mask 300 in an upper panel 200. A big arrow indicated in FIG. 2A shows a direction in which the scan-exposure is performed.

The upper panel 200 has an alignment layer (not shown because of a plan view) and a photo-alignment including exposure is performed on the alignment layer, which forms the pretilt of the alignment layer. FIG. 2A shows dividing the upper panel 200 into left and right regions, and scan-exposing the mask 300 or the upper panel 200 while the mask 300 or the upper panel 200 moves in up and down scan directions. First, the mask 300 used in the left region includes a light shielding region 370 and a light transmitting region 350. The light shielding region 370 has a structure in which a size thereof gradually widens toward the left direction, and the light transmitting region 350 has a structure in which a size thereof gradually narrows toward the left direction. When the left region is scan-exposed by using the mask 300, the pretilt is formed in the alignment layer as shown in the left region of FIG. 2B as an arrow.

The size of the pretilt is small in a left side of the left region which is slightly exposed by the narrow area of the light transmitting region e50, and the size of the pretilt is large in a right side of the left region which is largely exposed by the wide area of the light transmitting region 350, such that the pretilt value between the left side and the right side is gradually changed.

The mask 300 used in the right region of the upper panel 200 has a structure in which the light shielding region 370 gradually widens toward the right direction, unlike the mask 300 used in the left region. As a result, as shown by the sizes of the arrows in the right region of FIG. 2B, the size of the pretilt of the alignment layer is large in the left side which is largely exposed by the wide area of the light transmitting portion 350, and the size of the pretilt is small in the right side which is slightly exposed by the narrow area of the light transmitting portion 350, such that the pretilt value between the left side and the right side is gradually changed.

The upper panel 200 shown in FIGS. 2A and 2B represents one pixel, or represents a subpixel which is a part of one pixel. Even in another portion of the upper panel 200, the pretilt due to the photo-alignment is formed through a vertical scan.

Hereinafter, the term "a part of one pixel" is used to indicate a part of one pixel, but may also indicate one pixel, one subpixel, and some regions of other pixels. In addition, the liquid crystal layer 3 is divided into domains according to an alignment direction (alternatively, an azimuth angle) of the liquid crystal or a direction of the upper and lower pretilts. A plurality of domains may be included in one pixel, or a subpixel of one pixel.

The mask 300 for the upper panel and the lower panel shown in FIGS. 1A and 2A has a structure that can be used even in the scan-exposure of other regions, by merely rotating the mask. This has a merit in that a manufacturing cost of the mask 300 can be reduced, but in an alternatively exemplary embodiment, different masks having different structures may also be used.

FIG. 3 shows a pretilt formed by the photo-alignment in FIGS. 1A and 2A in a liquid crystal display 10, where overlapping of an upper pretilt and a lower pretilt are shown as arrows which overlap each other. In FIG. 3, a shaded quadrangle shape at the outer side edge of the liquid crystal display 10 represents a black matrix, and a shaded cross shape structure at the inner side of the liquid crystal display 10 represents an interface between the domains. FIGS. 3 and 4 show alpha α, beta β, and gamma γ. The alpha α represents the upper pretilt, the beta β represents the lower pretilt, and the gamma γ represents an azimuth angle of the liquid crystal. This will be described in detail in FIGS. 5 to 8.

With reference to the photo-alignment in FIGS. 1A and 1B, a total of four domains are included in one subpixel of one pixel of the liquid crystal display 10. The upper pretilt α and the lower pretilt β of each domain is as shown by the arrows in FIG. 3, and a line connecting azimuth angles (see FIGS. 5 to 8) of liquid crystal molecules is shown in FIG. 4.

The arrow of FIG. 4 is to connect the azimuth angles of liquid crystal molecules and has a gradually changing angle to form a curved line. In addition, in each domain, a direction parallel to a horizontal surface of two panels 100 and 200 (hereinafter, referred to as a first short-axis direction and see a γ1 direction of FIG. 8) among directions (short-axis directions of the liquid crystal molecules) perpendicular to the azimuth angles (gamma γ direction) of the liquid crystals in the domain is marked for every liquid crystal molecule and the directions are respectively connected to each other to form a straight line.

In FIG. 4, a virtual X-letter line is collectively formed by connected lines in each four directions, and each of the connected lines forms a 45 degree angle with a horizontal or vertical side direction with respect to a point in which all four domains meet with each other. This virtual X-letter line it is called a virtual line X. The liquid crystal molecules disposed at a point in which the virtual line X and the curved line of the azimuth angles shown in FIG. 4 meet with each other, has the azimuth angle of 45 degrees.

An azimuth angle of each liquid crystal molecule may be acquired by calculating an angle of the tangent at the corresponding position, or combining the upper pretilt with the lower pretilt shown as arrows in a vector manner. Since a large quantity of vector combinations are present in one domain, in FIG. 4, the azimuth angles for all liquid crystal molecules are not shown and the azimuth angles of only specific liquid crystals are connected to each other to form the curved line.

As such, in the case where the liquid crystal layer is arranged in the liquid crystal display 10, the liquid crystal molecules having various arrangements (e.g., alignment directions) are viewed from the side of the liquid crystal display 10 and luminance is detected based on an average value of the alignment directions of the corresponding liquid crystal molecules. As a result, although the positions of the liquid crystal molecules are changed at the side of the liquid crystal display 10, the luminance for the average value of the alignment directions is detected, such that a display characteristic of the liquid crystal display 10 is not rapidly changed and image quality is improved.

In addition, the liquid crystal layer of FIG. 3 uses a vertical alignment mode liquid crystal, and the liquid crystal layer is vertically aligned when an electric field is not applied. In contrast, when the electric field is applied, the liquid crystal layer is aligned in a predetermined direction according to the upper pretilt and the lower pretilt, which is referred to as an azimuth angle of the liquid crystal. The pretilt and the azimuth angle will be described in more detail through FIGS. 5 to 8.

The upper panel 200 includes an upper substrate 210 and an upper alignment layer 211, and the lower panel 100 includes a lower substrate 110 and a lower alignment layer 111 are shown in FIG. 5. The upper panel 200 and the lower panel 100 may include other constituent elements in addition to the substrate and the alignment layer, but are simply shown in FIG. 5 by including only the basic elements. In addition, only representative liquid crystal molecules among the liquid crystal molecules in one domain are shown in FIG. 5.

The liquid crystal layer 3 may be largely divided into three sections in a cross-sectional view of the liquid crystal layer 3. The three sections include an upper pretilt region UP, a lower pretilt region LP, and a middle region M.

The upper pretilt region UP represents a region in which a liquid crystal molecule 310 of the liquid crystal layer 3, adjacent to the upper alignment layer 211, is pretilted due to an alignment force of the upper alignment layer 211.

Figure 6:
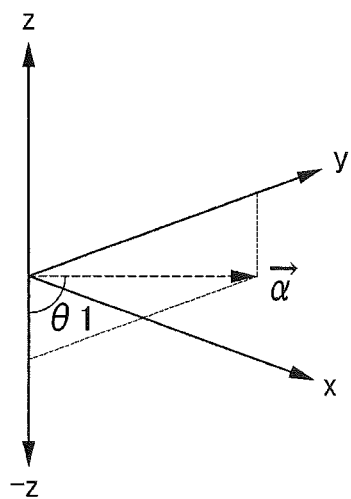
Figure 7:
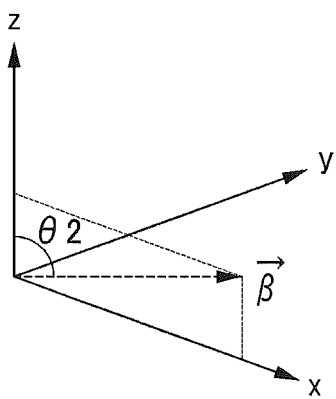

A long axis direction of the longitudinal axis of the liquid crystal molecule 310 of the upper pretilt region UP is arranged in an alpha vector direction, which is shown in FIG. 6 in detail. Herein, a z-axis direction as a direction toward the upper substrate 210 from the lower substrate 110 is perpendicular to the surface of each substrate 110 or 210, an x-axis direction is a short-side direction of the substrates 110 and 210 in the plan view, and a y-axis direction is a long-side direction of the substrates 110 and 210 in the plan view, but the directions may be opposite according to an alternative exemplary embodiment. An alpha vector direction of FIG. 6 is parallel to the long side direction of the substrates 110 and 210, and forms a θ1 angle with a −z axis. Herein, the θ1 angle is referred to as an upper pretilt value and is an angle in which the liquid crystal molecule 310 is pretilted by the upper alignment layer 211.

A long axis direction of the longitudinal axis of the liquid crystal molecule 310 in the lower pretilt region LP is arranged in a beta vector direction. The beta vector direction is particularly shown in FIG. 7, parallel to a short side direction of the substrates 110 and 210, and forms a θ2 angle with a +z axis. Herein, the θ2 angle is referred to as a lower pretilt value and is an angle in which the liquid crystal molecule 310 is pretilted by the lower alignment layer 111.

The pretilt regions UP and LP in one liquid crystal layer 3 are directly adjacent to the alignment layers 111 and 211, and a remainder of the liquid crystal layer 3 is in the middle region M. As a result, transmittance of light is mainly influenced by the arrangement of the liquid crystal molecule 310 in the middle region M. The liquid crystal molecule 310 of the middle region M is influenced and thereby arranged by the liquid crystal molecules 310 pretilted in the upper and lower pretilt regions UP and LP. In general, when the electric field is not applied, the liquid crystal molecule 310 is vertically aligned in the middle region M. However, when the electric field is applied, the liquid crystal molecule 310 of the middle region M is arranged in a predetermined direction under influence of the liquid crystal molecules 310 pretilted in the upper and lower pretilt regions UP and LP. The liquid crystal molecule 310 of the middle region M arranged in the predetermined direction by the electric field is shown in FIG. 5.

Figure 8:
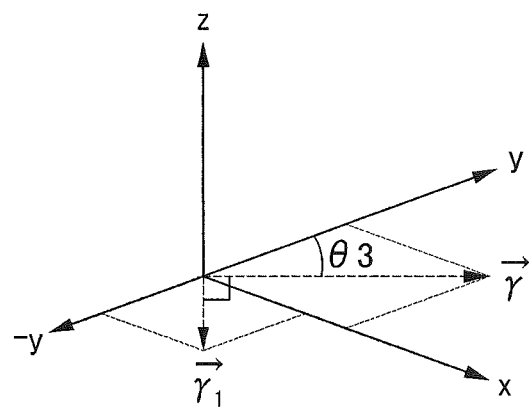

The liquid crystal of the middle region M is shown as the liquid crystal molecule 310 having a gamma vector direction in FIG. 5. In FIG. 8, the gamma vector direction forms a θ3 angle with a long side direction of the substrates 110 and 210 and hereinafter, the θ3 angle is referred to as an azimuth angle.

In addition, an azimuth angle γ1 in one direction parallel to a horizontal surface of two panels 100 and 200 among directions (short-axis directions of the liquid crystal molecules) perpendicular to the azimuth angle directions (gamma vector directions) of the liquid crystals in the one domain is also shown in FIG. 8. The azimuth angle γ1 direction is also referred to as a first short-axis direction.

In the exemplary embodiments of the invention of FIGS. 1A to 4, the pretilt degree of the liquid crystal molecule in one domain is gradually changed. That is, the pretilt value (shown as a vertical arrow in FIG. 3) provided by the upper panel 200 is gradually changed and the pretilt value (shown as a horizontal arrow in FIG. 3) provided by the lower panel 100 is gradually changed.

As a result, since one domain is difficult to be maintained as one alignment direction, a curved line in which the azimuth angles of each liquid crystal molecule are connected to each other is shown in FIG. 4. The curved line in FIG. 4 means that the azimuth angles of the liquid crystal molecules are gradually changed along the arrow direction.

FIGS. 1A to 4 show the case where the upper pretilt and the lower pretilt are gradually changed in one domain, but the changed ranges are the same as each other. That is, in this case, in one domain, a maximum value and a minimum value of the upper pretilt are the same as a maximum value and a minimum value of the lower pretilt and even in the exposure, a maximum exposure amount and a minimum exposure amount are the same as each other.

However, the range of the upper pretilt values and the range of the lower pretilt values may be different from each other and an exemplary embodiment thereof will be described with reference to FIGS. 9 and 10.

Figure 9:
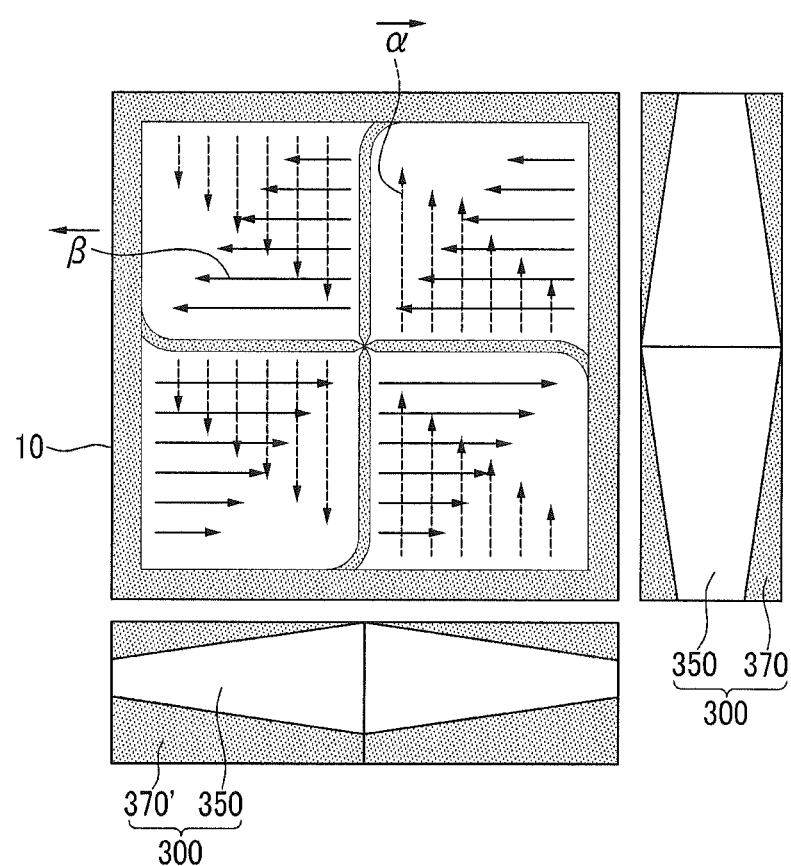
FIG. 9 is a diagram showing another exemplary embodiment of a mask, and an upper pretilt and a lower pretilt which are formed in a liquid crystal display depending on the mask, according to the invention.
Figure 10:
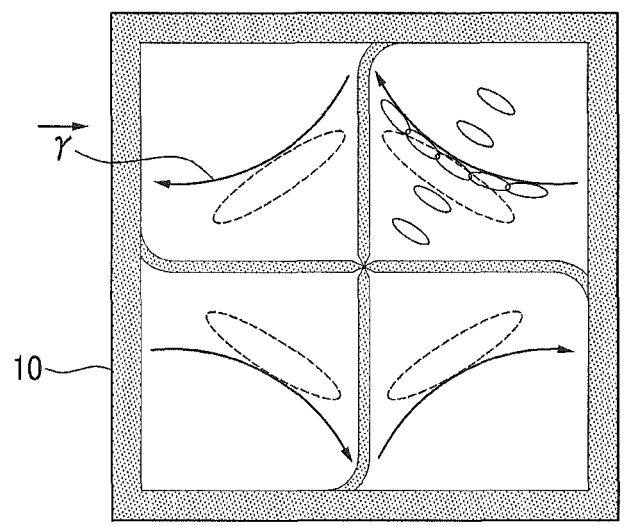
FIG. 10 is a diagram showing another exemplary embodiment of liquid crystal azimuth angles of a liquid crystal display as arrows, according to the invention.

FIG. 9 is a diagram showing a mask and an upper pretilt and a lower pretilt which are formed in a liquid crystal display depending on the mask according to another exemplary embodiment of the invention and FIG. 10 is a diagram showing liquid crystal azimuth angles of a liquid crystal display as arrows according to another exemplary embodiment of the invention.

In FIG. 9, unlike FIG. 3, a mask 300 scanning an upper panel 200 upward and downward has a relatively wide light shielding region 370'. As a result, an exposure amount is reduced such that an upper pretilt is reduced. Accordingly, azimuth angles of a liquid crystal layer are determined according to the reduced upper pretilt, which is as shown in FIG. 10. As compared with FIG. 4, in FIG. 10, the pretilt in a horizontal direction (e.g., the lower pretilt β) is larger than that in a vertical direction (e.g., the upper pretilt α), such that a horizontal direction component among azimuth angle components of the liquid crystal layer is larger.

In addition, when describing the alignment of the liquid crystal molecule, an arrow of FIG. 10 connects the azimuth angles of each liquid crystal molecule and has a gradually changed angle to form a curved line. Further, the first short-axis directions of the liquid crystal molecules are indicated for every liquid crystal molecule and connected to each other to form a straight line. The exemplary embodiment of FIGS. 9 and 10 has the alignment structure of the liquid crystal molecules similar to that of FIGS. 3 and 4, but has an azimuth angle in which a short side component decreases and a long side component relatively increases.

Herein, since a medium-large display device such as a television, a monitor, and the like has a structure in which a right and left dimension is wider than an up and down direction, the up and down direction may be a short side direction of the display panel and the right and left direction may be a long side direction of the display panel. The structure may vary according to an exemplary embodiment, but hereinafter, an exemplary embodiment in which the right and left direction is the same as the long side direction of the display panel will be described. In addition, the long side direction of the display panel is briefly referred to as a long side direction.

As shown in FIG. 10, if a component of the long side direction among the azimuth angle components of the liquid crystal layer further increases, visibility in left and right sides increases as compared with the exemplary embodiment of FIG. 4, but visibility in the up and down direction further decreases as compared with the exemplary embodiment of FIG. 4. However, in the large liquid crystal display such as a television, since many people watch the liquid crystal display from the left and right sides, in some cases, left and right visibility is important compared with up and down visibility. In addition, the exemplary embodiment of FIG. 10 may provide more improved display quality than the exemplary embodiment of FIG. 4. However, since the exemplary embodiment of FIG. 4 has relatively high transmittance as compared with the exemplary embodiment of FIG. 10, the exemplary embodiment of FIG. 4 or the exemplary embodiment of FIG. 10 is selected according to a usage environment and may be used in a medium-large display device such as a television.

Hereinafter, how an azimuth angle, a visibility coefficient, and transmittance are changed according to an exemplary embodiment of the invention will be described with reference to FIGS. 11 to 21. Herein, the visibility coefficient is represented by a gamma distortion index ("GDI") and since the visibility coefficient is a value representing a distortion amount as compared with reference gamma, as the value is large, side visibility is deteriorated.

Figure 17:
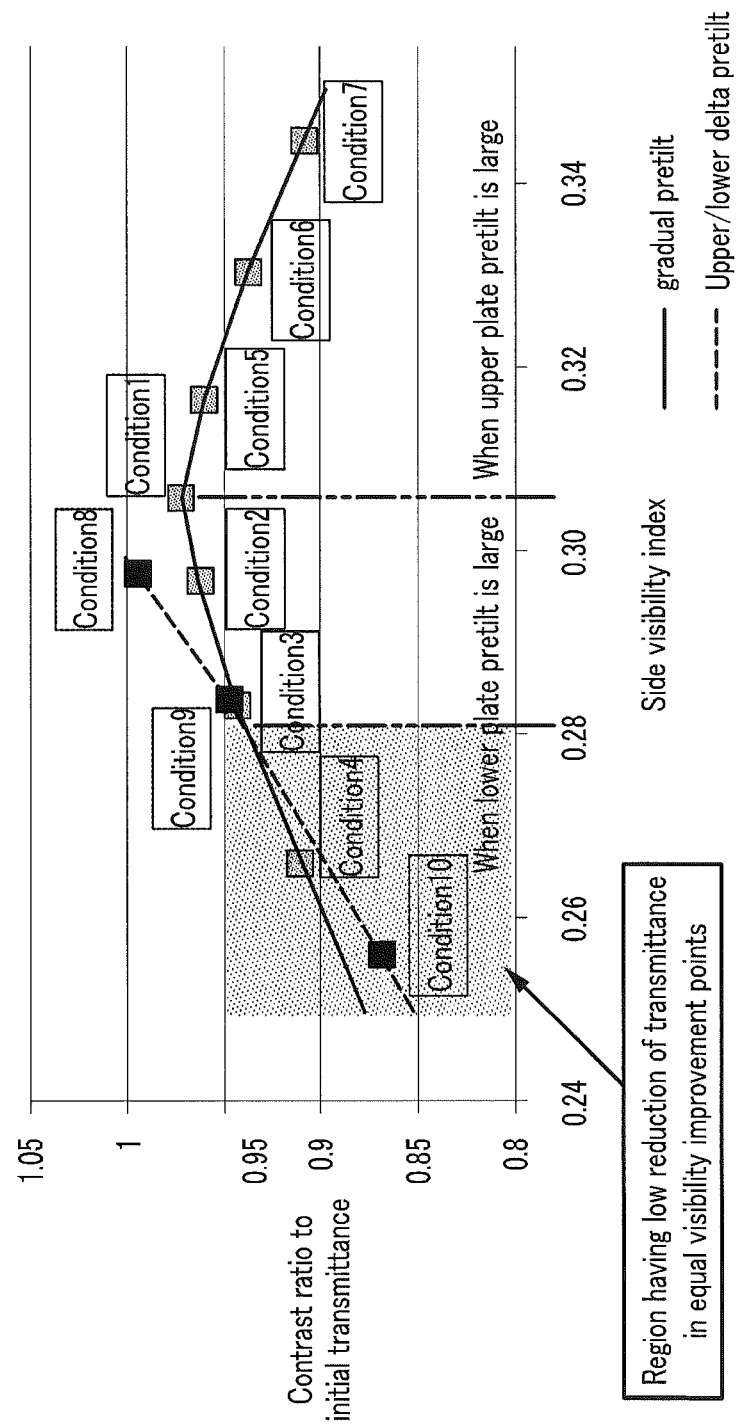
FIG. 17 is a diagram graphically illustrating the results of FIG. 16.

FIG. 11 is a result table of exemplary embodiments of actual measurements of a coefficient of right side visibility, an azimuth angle, and transmittance depending on a difference between an upper pretilt and a lower pretilt according to the invention, FIG. 12 is a table of expanded data through interpolation and extrapolation based on the actual values of FIG. 11, FIGS. 13 to 15 are graphs showing the expanded data of FIG. 12, FIG. 16 is a table in which side visibility and transmittance were calculated based on the actual results of FIG. 11 according to the case where an upper pretilt and a lower pretilt have predetermined ranges, FIG. 17 is a diagram graphically illustrating the results of FIG. 16, and FIGS. 18 to 21 are tables showing data of an upper plate pretilt, a lower plate pretilt, a difference in pretilts of the upper and lower plates, right side visibility, and transmittance as one table with respect to conditions 1 to 4 of FIG. 16.

FIG. 11 is a table including a visibility coefficient GDI, an azimuth angle (shown as an 'Azimuth angle'), an angle movement of the azimuth angle (shown as 'Azimuthal'), and transmittance ('T ratio for each Azi angle') are actually measured according to a difference (shown as a 'delta pt') between an upper pretilt and a lower pretilt. Herein, the angle movement of the azimuth angle (Azimuthal) is a value which represents a changed angle based on an azimuth angle of 45 degrees and the transmittance represents a ratio based on 1 when the azimuth angle is 45 degrees.

Figure 13:
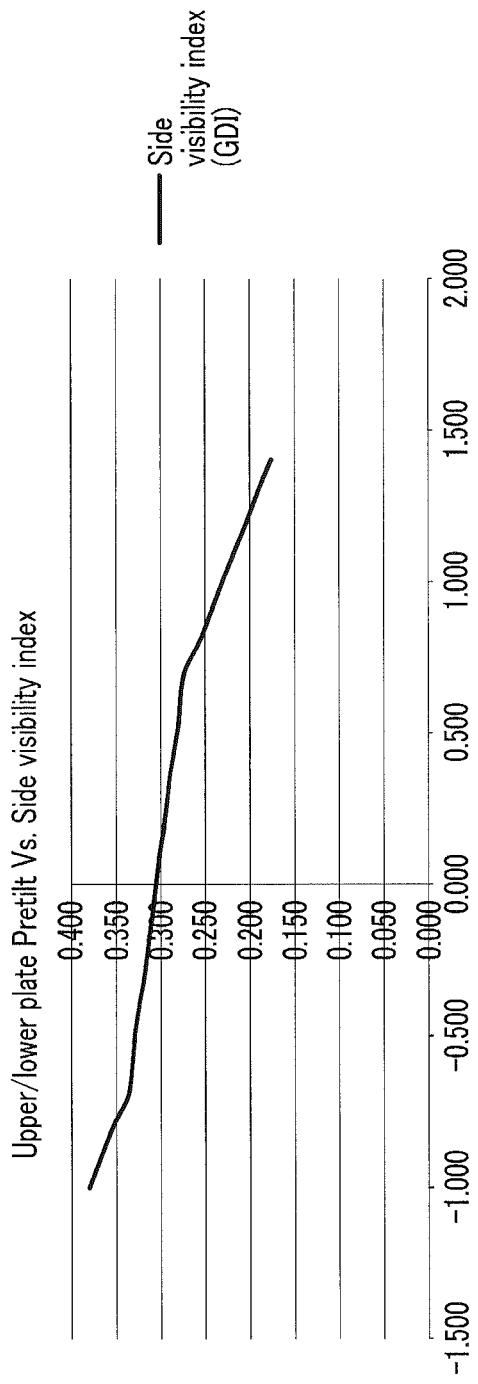
FIGS. 13 to 15 are graphs showing the expanded data of FIG. 12.
Figure 14:
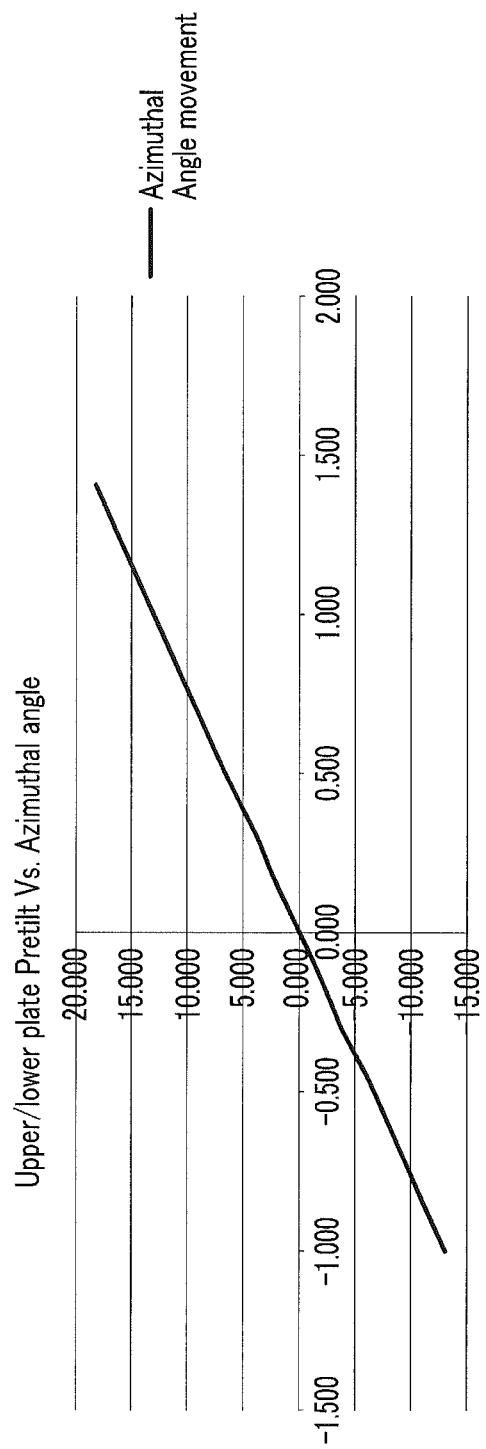
Figure 15:
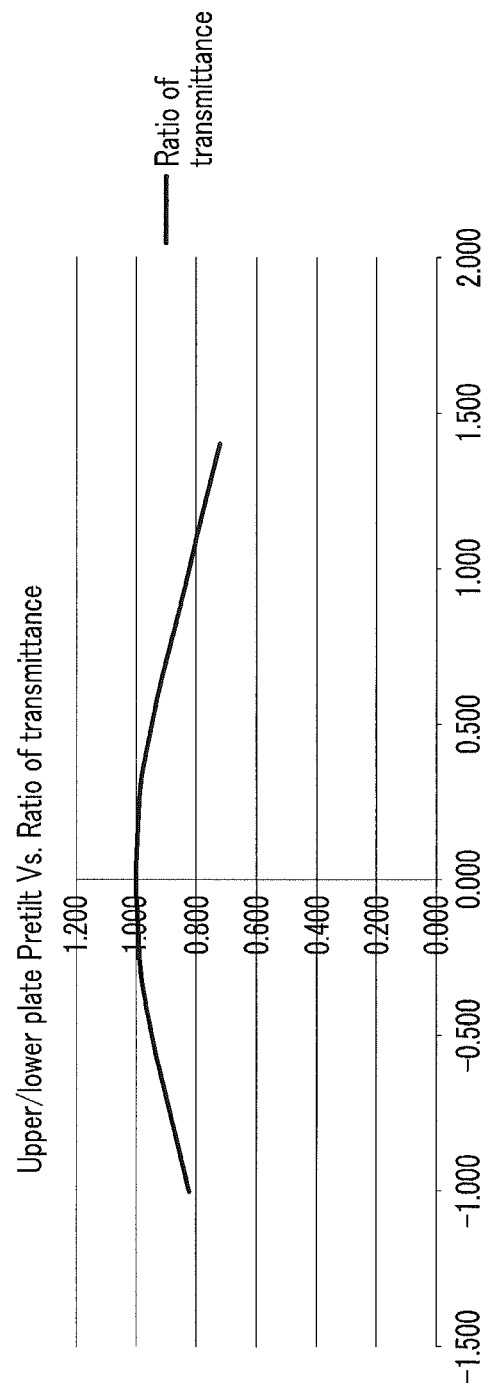

Dimensions as shown in FIG. 12 are further subdivided through interpolation and extrapolation on the basis of the actual value as shown in FIG. 11 and then, graphs of FIGS. 13 to 15 are drawn based on the subdivided dimensions.

In FIG. 12, a difference between an upper pretilt and a lower pretilt is shown as a delta pretilt (lower plate-upper plate) and when a pretilt value of the upper plate is large, the pretilt value has a minus value. A side visibility index GDI is a visibility index value at the right side. In the "Azimuthal angle movement", based on 45 degrees as the azimuth angle, an increasing direction of the component of the long side direction is indicated as positive (e.g., + (plus)) and an increasing direction of the component of the short side direction is indicated as − (minus). A transmittance ratio represents a ratio based on transmittance when there is no difference between the pretilt values of the upper and lower plates.

When a difference between the upper pretilt and the lower pretilt is a minus value, since the pretilt of the upper plate is larger, the azimuth angles (Azimuth) in the exemplary embodiments of FIGS. 1 to 10 have more short side components and relatively little long side components (horizontal components), such that the right side visibility index GDI increases and visibility is deteriorated.

In FIG. 13, the right side visibility index GDI further increases when the upper plate pretilt is large and as a result, the side visibility index increases and visibility is deteriorated. In addition, in FIG. 14, the azimuth angles of the liquid crystals are regularly changed due to the difference between the pretilts of the upper and lower plates and when the horizontal components increase, the difference is plus. Further, FIG. 15 shows a ratio in transmittance and the case where there is no difference between the pretilts of the upper and lower plates has the best transmittance. That is, since improvement of the side visibility in a predetermined direction relates to the deterioration of the transmittance, whether any of side visibility and transmittance is further considered as important, should be determined. When luminance of the liquid crystal display is sufficiently brightened and photo-alignment is performed as the exemplary embodiment, since high luminance is shown due to the improved transmittance, the side visibility is considered as more important than the transmittance.

FIG. 16 shows side visibility GDI and transmittance of an exemplary embodiment where the upper pretilt and the lower pretilt have a range in one domain.

In FIG. 16, an initial condition (normal photo-alignment) is to set a reference of the transmittance and the side visibility and is the case where the pretilts of the upper and lower plates are fixed as 1.8 degrees in the domain. In addition, in FIG. 16, conditions 8 to 10 as Comparative Example are the case where only the pretilt of the lower plate is largely formed in order to improve the side visibility. In conditions 8 to 10, only one pretilt value is formed in one domain and is not gradually changed.

The exemplary embodiments of the invention are shown in conditions 1 to 7. Condition 1 is the case where the upper plate pretilt and the lower plate pretilt have the same range, conditions 2 to 4 is the case where the lower plate pretilt is large, and conditions 5 to 7 is the case where the upper plate pretilt is large. Condition 1 may correspond to the exemplary embodiment of FIGS. 3 and 4 because the upper plate pretilt and the lower plate pretilt have the same range and conditions 2 to 4 may correspond to the exemplary embodiment of FIGS. 9 and 10. Conditions 5 to 7 are not shown by a separate drawing, but the upper pretilt is larger than the lower pretilt and the component of the short side direction in the azimuth angle is larger. In this case, vertical visibility is improved and side visibility is deteriorated, such that it may be not suitable for improving side visibility.

In FIG. 16, a range of the upper pretilt and a range of the lower pretilt for each condition are described in detail.

In FIG. 16, side visibility is improved from condition 1 toward condition 4 (the GDI index value decreases), but transmittance is reduced. Side visibility is deteriorated toward condition 7 from condition 5 and transmittance is deteriorated.

As Comparative Example, in conditions 8 to 10, gradually changed pretilt is not provided, but side visibility can be numerically reduced. FIG. 17 is provided in order to compare the Comparative Example with conditions 1 to 4.

In FIG. 17, since conditions 8 to 10 as the Comparative Example may also have the improved side visibility and the deterioration in the transmittance is little, conditions 8 to 10 may also have a characteristic almost similar to conditions 1 to 4 of the exemplary embodiment of the invention. However, in Comparative Example, since the transmittance is rapidly deteriorated in condition 10, when the liquid crystal display is formed so as to have side visibility of a predetermined level or more, it is preferable to provide the gradually changed pretilt as compared with having the predetermined pretilt in one domain as Comparative Example. In this case, a dotted line of FIG. 17 is in accordance with conditions 8 to 10 and a solid line is in accordance with conditions 1 to 4. In the case where the solid line represents higher transmittance and a lower visibility index than the dotted line, the visibility index of about 0.281 or less occurs. Therefore, in order to provide the liquid crystal display having visibility index of 0.281 or less, the exemplary embodiment according to the invention may be more preferable as compared with Comparative Example.

In a region having at a visibility index of 0.281 or more, the exemplary embodiment of the invention has relatively low transmittance as compared with Comparative Example, but a degree of the lower transmittance is not large, such that it is possible to successfully produce the liquid crystal display.

In addition, like the Comparative Example, when the liquid crystal layer is arranged in a predetermined direction, side visibility is good in the predetermined direction according to an azimuth angle of the liquid crystal molecules, but display quality cannot help being deteriorated as being far away from the corresponding direction. However, like the exemplary embodiment of the invention, when the pretilt is gradually changed and the azimuth angle of the liquid crystal molecule is gradually changed, the deterioration of display quality according to a side position is low, such that uniform display quality of a predetermined level or more can be provided at various sides.

FIGS. 18 to 21 show right side visibility and transmittance of the corresponding position while changing the pretilt by every 0.2 with respect to conditions 1 to 4 and the number indicated in one box is configured by two rows represented by the following type.

First row—upper plate pretilt value/lower plate pretilt value (difference in pretilt value)

Second row—right visibility index value (transmittance value)

In addition, in FIGS. 18 to 21, since an exemplary embodiment of the invention includes a subpixel of the pixel having four domains, the tables include a thick black color line to indicate the four domains.

Each box represents visibility index and transmittance at only the corresponding position and when viewing the display device, the person recognizes a gray according to total sum of the portions. In particular, since values in each box of FIGS. 18 to 21 are represented based on a value of every 0.2 among the upper pretilt values and the lower pretilt values which are gradually changed, side visibility index and transmittance which are gradually changed are recognized unlike FIGS. 18 to 21.

As a result, one domain has various characteristics to be recognized through an average even at positions of various sides, such that display quality can be uniform.

Referring to FIGS. 16 and 18, side visibility of 0.305 has the same value as the initial condition, but transmittance has only 97% of the initial condition. Referring to FIGS. 16 and 19, side visibility of 0.294 is improved by 0.011 as compared with the initial condition, but transmittance is deteriorated by 96%. In addition, referring FIGS. 16 and 20, side visibility of 0.281 is improved by 0.024 as compared with the initial condition, but transmittance is deteriorated by 94% and to FIGS. 16 and 21, side visibility of 0.266 is improved by 0.039 as compared with the initial condition, but transmittance is deteriorated by 91%.

In FIGS. 11 to 21, as the upper pretilt increases, the short-side directional (vertical directional) component of the azimuth angle increases and the reason is because the upper pretilt of the exemplary embodiments of FIGS. 3, 4, 9, and 10 is in a vertical direction in the. However, according to an alternative exemplary embodiment, the upper panel may be scan-exposed in the horizontal direction. In the case where the upper panel is scan-exposed in the horizontal direction, when the pretilt value of the upper panel increases, the long-side directional (horizontal directional) component of the liquid crystal azimuth angle increases.

Figure 22:
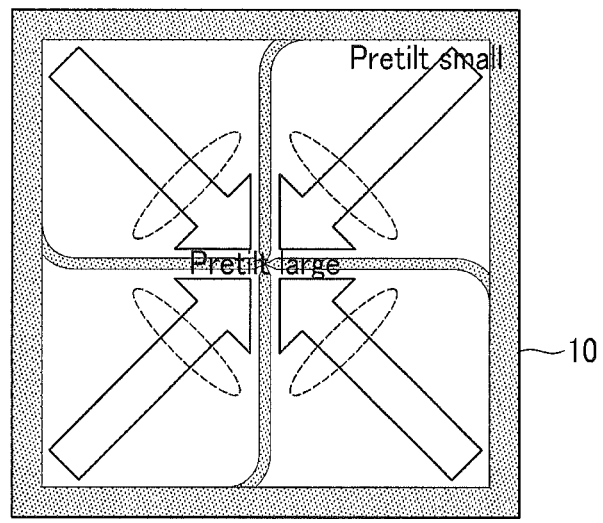
FIG. 22 is a diagram showing an exemplary embodiment of directions of an increasing direction of a pretilt, based on the exemplary embodiment of FIG. 3 or FIG. 9.

The exemplary embodiments of FIGS. 3, 4, 9, and 10 have an increasing direction of a pretilt as show in FIG. 22.

FIG. 22 is a diagram showing an exemplary embodiment of directions of an increasing direction of a pretilt of the exemplary embodiment of FIG. 3 or FIG. 9.

That is, referring to FIG. 3, a portion where both the upper pretilt and the lower pretilt are large is a region where the four domains contact or are directly adjacent to each other, and a portion where both the upper pretilt and the lower pretilt are small is adjacent to an edge region of the black matrix of FIG. 3. Therefore, as FIG. 22, large/small of the pretilt may be shown.

However, unlike FIGS. 3, 4, 9, 10 and 22, a liquid crystal display having various structures may be formed and hereinafter, it will be described with reference to FIGS. 23 to 37.

Figure 23:
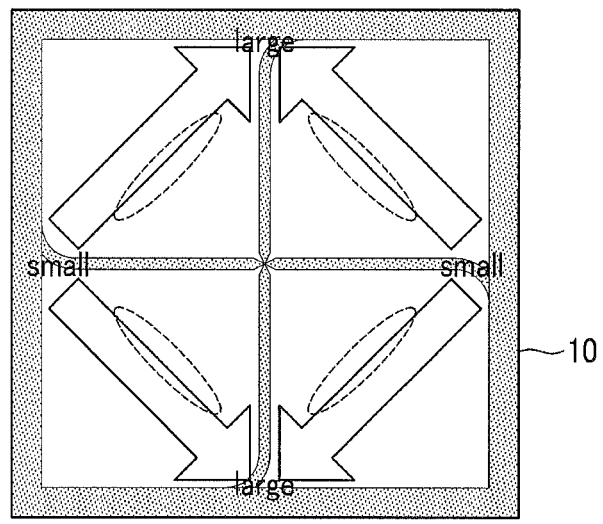
FIG. 23 is a diagram showing another exemplary embodiment of increasing directions of a pretilt, according to the invention.

FIG. 23 is a diagram showing another exemplary embodiment of increasing directions of a pretilt according to the invention.

Figure 24:
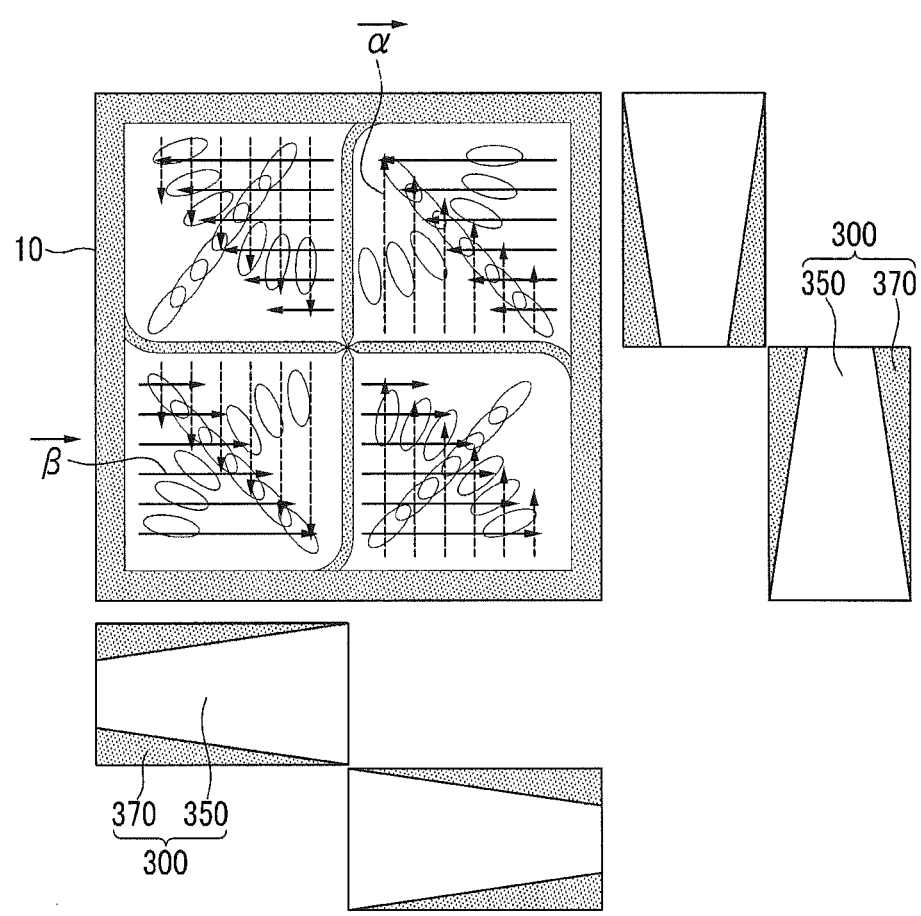
FIGS. 24 and 25 are diagrams showing an exemplary embodiment of a mask and an upper pretilt and a lower pretilt of a liquid crystal display based on the exemplary embodiment of FIG. 23, and liquid crystal azimuth angles of a liquid crystal display as arrows.
Figure 25:
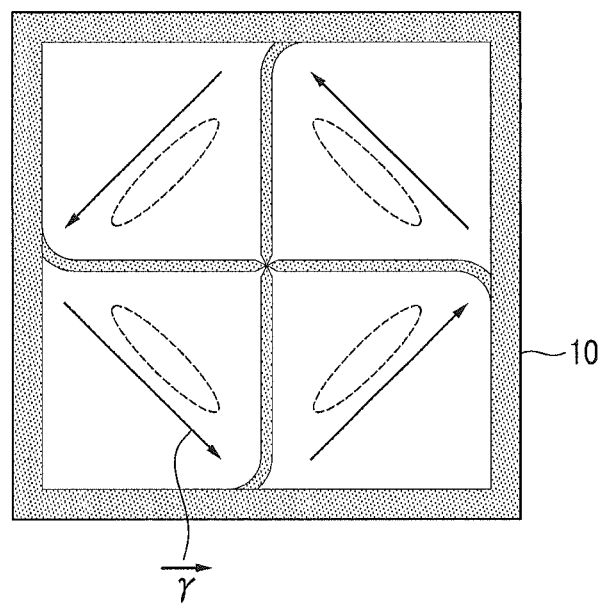
Figure 26:
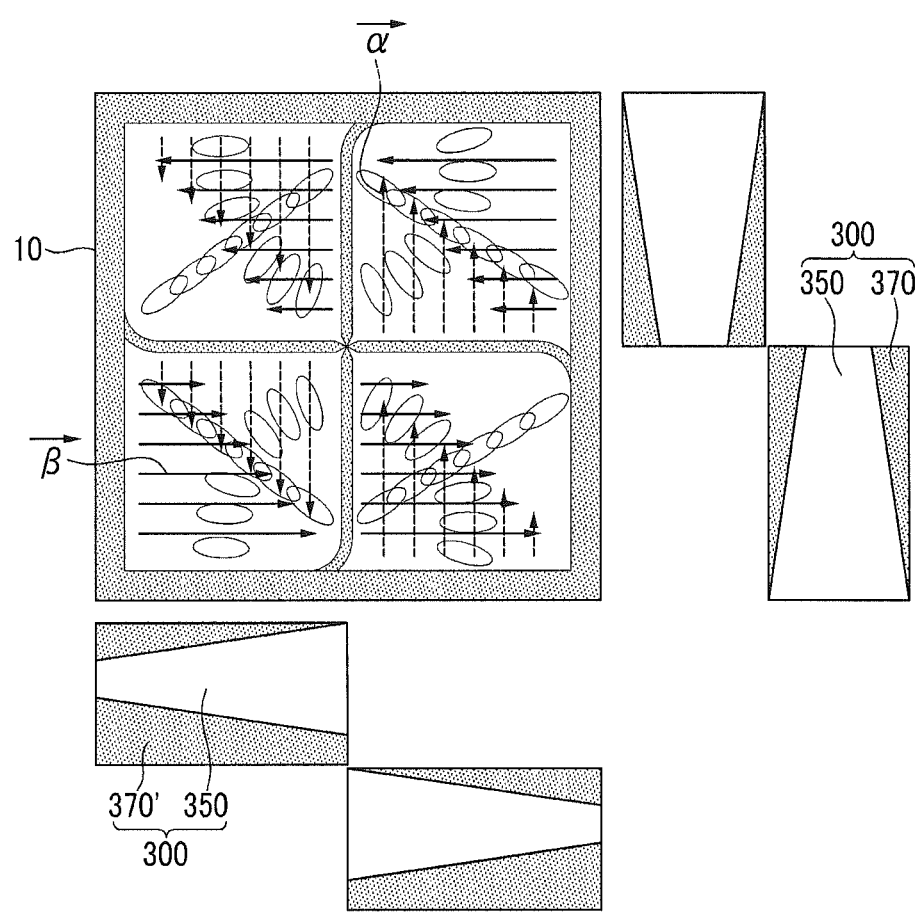
FIGS. 26 and 27 are diagrams showing another exemplary embodiment of a mask and an upper pretilt and a lower pretilt of a liquid crystal display according based on the exemplary embodiment of FIG. 23, and liquid crystal azimuth angles of a liquid crystal display as arrows.
Figure 27:
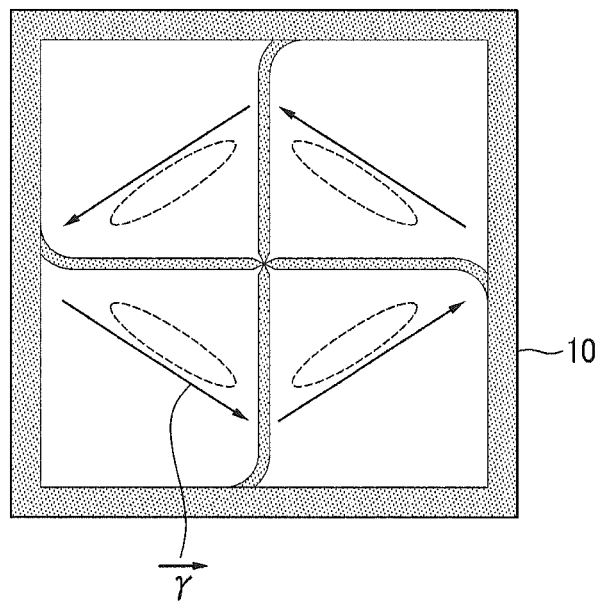

The exemplary embodiment having the pretilt increasing direction as FIG. 23 includes an exemplary embodiment of FIGS. 24 and 25 and an exemplary embodiment of FIGS. 26 and 27.

The exemplary embodiment of FIGS. 24 and 25 will be described.

FIGS. 24 and 25 are diagrams showing a mask and an upper pretilt and a lower pretilt of a liquid crystal display according to the exemplary embodiment of FIG. 23, and include arrows indicating connection of liquid crystal molecule azimuth angles in a liquid crystal display.

In FIG. 24, the lower panel 100 of the liquid crystal display 10 is divided into an upper region and a lower region, and is photo-aligned by using the mask 300 shown at the right side thereof. An upper panel 200 of the liquid crystal display 10 is divided into a left region and a right region and is photo-aligned by using a mask 300 shown below thereof.

In the photo-aligning described above, the upper and lower panels 100 and 200 have an upper pretilt $\alpha$ direction (shown as a dotted line) and a lower pretilt $\beta$ direction (shown as a solid line) as shown in FIG. 24. An azimuth angle $\gamma$ of the liquid crystal is represented as FIG. 25.

An arrow of FIG. 25 connects azimuth angles (Azimuth angle) of the liquid crystal molecules to form a straight line. In addition, first short-axis directions of the liquid crystal molecules are indicated for every liquid crystal molecule and are connected to each other to form a curved line having gradually changed angles. This is shown in FIG. 24, where liquid crystal molecules are arranged in a curved line.

Each arrow shown in FIG. 25 is a center line obliquely crossing the domain and forms an angle of 45 degrees with a long side direction. The liquid crystal molecules of each domain may be symmetrically arranged based on the center line.

Azimuth angles $\gamma$ of liquid crystal molecules are connected to each other to form a straight line having a large long side directional component furthest from the center line, and may have a radial structure based on the center line. This may be verified by vector-sum of arrows representing the alignment of the liquid crystal molecules, the upper pretilt, and the lower pretilt shown in FIG. 24.

In a representative alignment of liquid crystal molecules shown in FIG. 24, azimuth angles of a plurality of liquid crystal molecules have a fan shape in one domain. In addition, one of the liquid crystal molecules in the fan shape is selected, and the azimuth angles of the liquid crystal molecules which are disposed along the azimuth angle $\gamma$ of the selected liquid crystal molecule are connected to each other so as to form a straight line. The straight line including the liquid crystal molecules disposed at the center of the domain forms an angle of 45 degrees with the long side direction.

In FIGS. 24 and 25, the ranges of the upper pretilt and the lower pretilt are the same as each other, but may be different from each other. This is shown in FIGS. 26 and 27.

FIGS. 26 and 27 are diagrams showing another exemplary embodiment of a mask and an upper pretilt and a lower pretilt of a liquid crystal display according to the exemplary embodiment of FIG. 23, and include arrows indicating connection of liquid crystal azimuth angles in a liquid crystal display.

In FIG. 26, the mask 300 (lower mask) photo-aligning the upper panel 200 has a wider light shielding region 370' and accordingly, the upper pretilt is relatively small. As a result, in the azimuth angle of each liquid crystal molecule, a component of a vertical direction (short-side direction) is relatively reduced.

An arrow of FIG. 27 connects azimuth angles (Azimuth angle) of the liquid crystal molecules to form a straight line. In addition, first short-axis directions of the liquid crystal molecules are indicated for every liquid crystal molecule and are connected to each other to form a curved line having gradually changed angles. This is shown in FIG. 26, where the liquid crystal molecules are arranged in a curved line. The liquid crystal molecule alignment of FIGS. 26 and 27 is similar to that of FIGS. 24 and 25, but the long-side directional component is relatively large and this may be verified in the arrow shown in FIG. 27.

A representative alignment of the liquid crystal molecules is shown in FIG. 26.

The alignment structure of the liquid crystal molecules of FIGS. 26 and 27 is similar to that of FIGS. 24 and 25. A difference is in that the liquid crystal molecules have relatively many long-side directional components as compared with the exemplary embodiment of FIGS. 24 and 25.

Therefore, even in an alignment of liquid crystal molecules shown in FIG. 26, azimuth angles of a plurality of liquid crystal molecules have a fan shape in one domain. In addition, one of the liquid crystal molecules in the fan shape is selected and the azimuth angles of the liquid crystal molecules which are disposed along the azimuth angle γ of the elected liquid crystal molecule are connected to each other so as to form a straight line.

Figure 28:
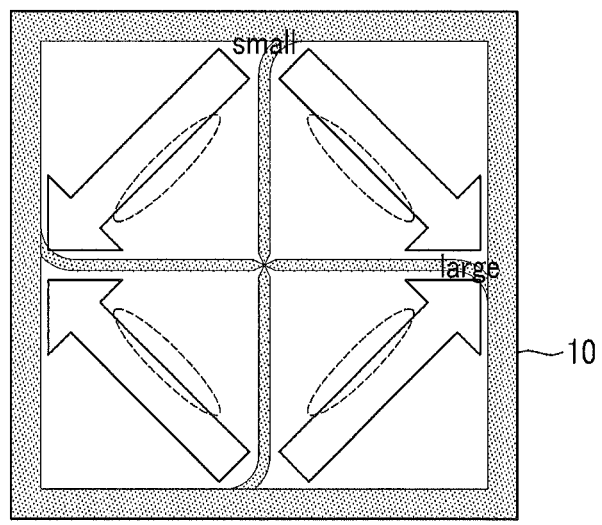
FIG. 28 is a diagram showing another exemplary embodiment of increasing directions of a pretilt, according to the invention.

FIG. 28 is a diagram showing another exemplary embodiment of directions of an increasing direction of a pretilt according the invention.

Figure 29:
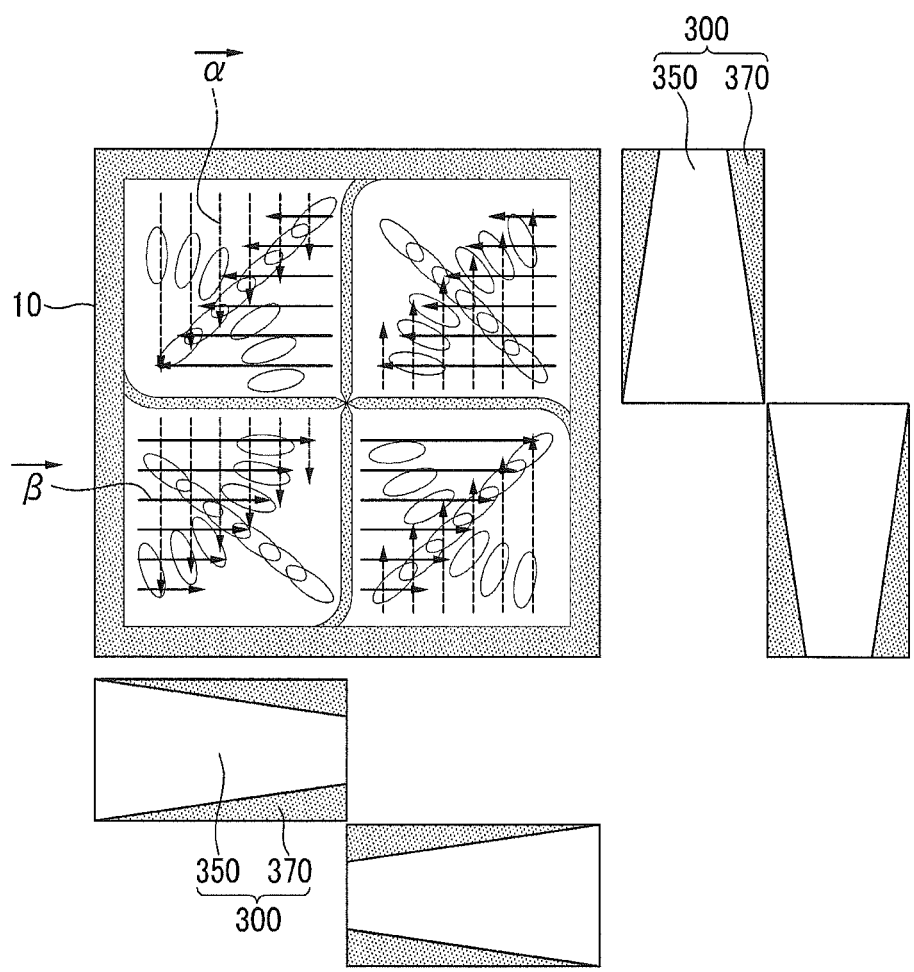
FIGS. 29 and 30 are diagrams showing an exemplary embodiment of a mask and an upper pretilt and a lower pretilt of a liquid crystal display based on the exemplary embodiment of FIG. 28, and liquid crystal azimuth angles of a liquid crystal display as arrows.
Figure 30:
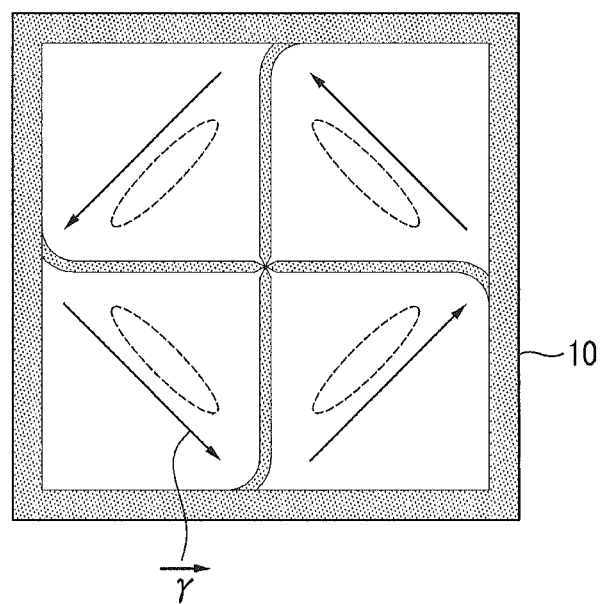
Figure 31:
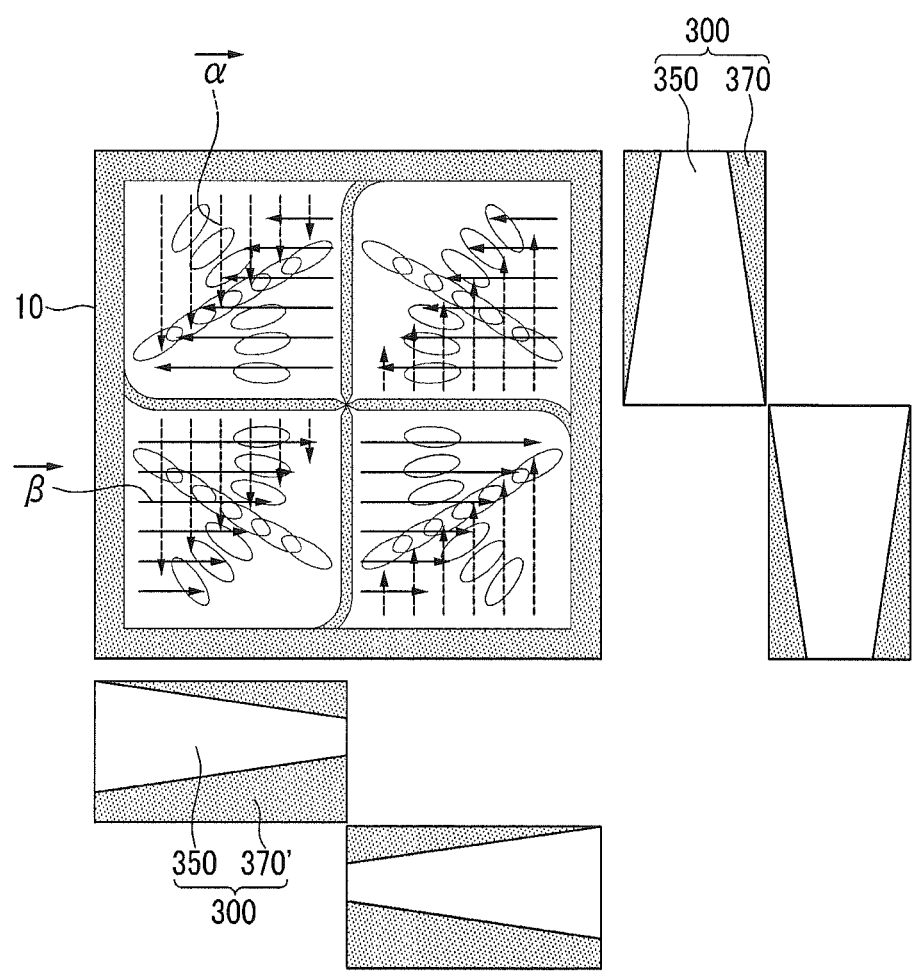
FIGS. 31 and 32 are diagrams showing another exemplary embodiment of a mask and an upper pretilt and a lower pretilt of a liquid crystal display according based on the exemplary embodiment of FIG. 28, and liquid crystal azimuth angles of a liquid crystal display as arrows.
Figure 32:
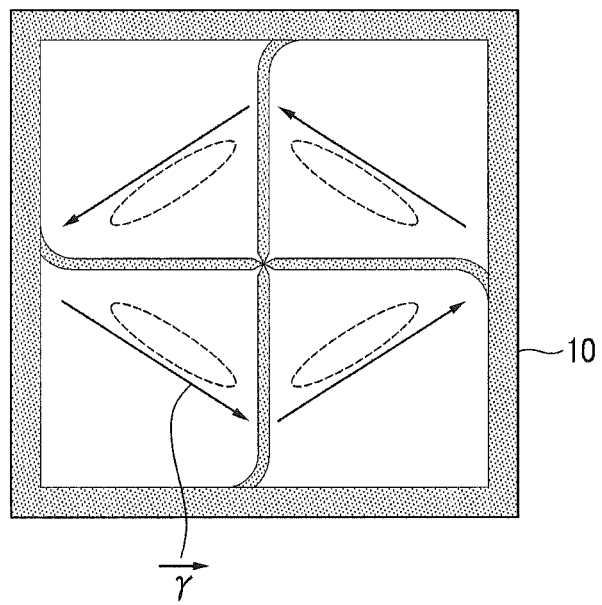

The exemplary embodiment having the pretilt increasing direction as FIG. 28 includes an exemplary embodiment of FIGS. 29 and 30 and an exemplary embodiment of FIGS. 31 and 32.

The exemplary embodiment of FIGS. 29 and 30 will be described.

FIGS. 29 and 30 are diagrams showing an exemplary embodiment of a mask and an upper pretilt and a lower pretilt of a liquid crystal display according to the exemplary embodiment of FIG. 28, and include arrows indicating connection of liquid crystal molecule azimuth angles in a liquid crystal display as arrows.

In FIG. 29, the lower panel 100 of the liquid crystal display 10 is divided into an upper region and a lower region, and is photo-aligned by using the mask 300 shown at the right side thereof. An upper panel 200 of the liquid crystal display 10 is divided into a left region and a right region and is photo-aligned by using a mask 300 shown below thereof.

In the photo-aligning described above, the upper and lower panels 100 and 200 have an upper pretilt α direction (shown as a dotted line) and a lower pretilt β direction (shown as a solid line) as shown in FIG. 29. An azimuth angle γ of the liquid crystal is represented as FIG. 30.

An arrow of FIG. 30 connects azimuth angles (Azimuth angle) of the liquid crystal molecules to form a straight line. In addition, first short-axis directions of the liquid crystal molecules are indicated for every liquid crystal molecule and are connected to each other to form a curved line having gradually changed angles. This is shown in FIG. 29 where liquid crystal molecules are arranged in a curved line.

Each arrow shown in FIG. 30 is a center line obliquely crossing the domain and forms an angle of 45 degrees with a long side direction. The liquid crystal molecules of each domain may be symmetrically arranged based on the center line.

Azimuth angles γ of liquid crystal molecules are connected to each other to form a straight line having a large long side direction component furthest from the center line, and may have a radial structure based on the center line. This may be verified by vector-sum of arrows representing the alignment of the liquid crystal molecules, the upper pretilt, and the lower pretilt shown in FIG. 29.

In a representative alignment of liquid crystal molecules shown in FIG. 29, azimuth angles of a plurality of liquid crystal molecules have a fan shape in one domain. In addition, one of the liquid crystal molecules in the fan shape is selected, and the azimuth angles of the liquid crystal molecules which are disposed along the azimuth angle γ of the selected liquid crystal molecule are connected to each other so as to form a straight line. The straight line including the liquid crystal molecules disposed at the center of the domain forms an angle of 45 degrees with the long side direction.

In FIGS. 29 and 30, the ranges of the upper pretilt and the lower pretilt are the same as each other, but may be different from each other. This is shown in FIGS. 31 and 32.

FIGS. 31 and 32 are diagrams showing another exemplary embodiment of a mask and an upper pretilt and a lower pretilt of a liquid crystal display according to the exemplary embodiment of FIG. 28, and include arrows indicating connection of liquid crystal azimuth angles in a liquid crystal display.

In FIG. 31, the mask 300 (lower mask) photo-aligning the upper panel 200 has a wider light shielding region 370' and accordingly, the upper pretilt is relatively small. As a result, in the azimuth angle of each liquid crystal molecule, a vertical directional (short-side directional) component is reduced.

An arrow of FIG. 32 connects azimuth angles (Azimuth angle) of the liquid crystal molecules to form a straight line. In addition, first short-axis directions of the liquid crystal molecules are indicated for every liquid crystal molecule and are connected to each other to form a curved line having gradually changed angles. This is shown in FIG. 31 where the liquid crystal molecules are arranged in a curved line. The liquid crystal molecule alignment of FIGS. 31 and 32 is similar to that of FIGS. 29 and 30, but the long-side directional component is relatively large and this may be verified in the arrow shown in FIG. 32.

A representative alignment of the liquid crystal molecules is shown even in FIG. 31.

The alignment structure of the liquid crystal molecules of FIGS. 31 and 32 is similar to that of FIGS. 29 and 30. A difference is in that the liquid crystal molecules have relatively many long-side directional components as compared with the exemplary embodiment of FIGS. 29 and 30.

Therefore, even in an alignment of liquid crystal molecules shown in FIG. 31, azimuth angles of liquid crystal molecules have a fan shape in one domain. In addition, one of the liquid crystal molecules in the fan shape is selected and the azimuth angles of the liquid crystal molecules which are disposed along the azimuth angle γ of the selected liquid crystal molecule are connected to each other so as to form a straight line.

Figure 33:
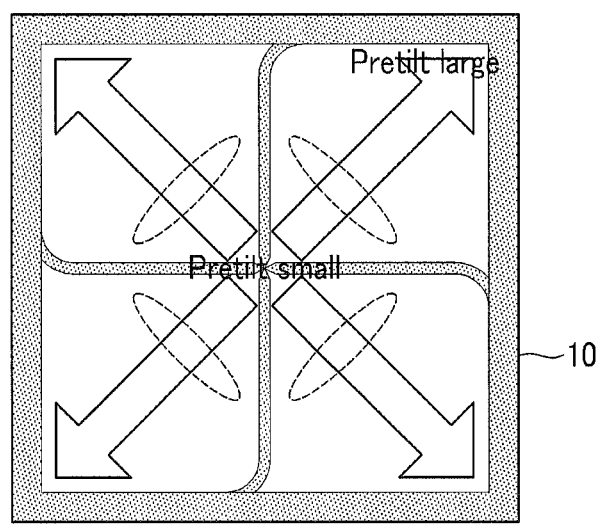
FIG. 33 is a diagram showing another exemplary embodiment of increasing directions of a pretilt, according to the invention.

FIG. 33 is a diagram showing another exemplary embodiment of an increasing direction of a pretilt according to the invention.

Figure 34:
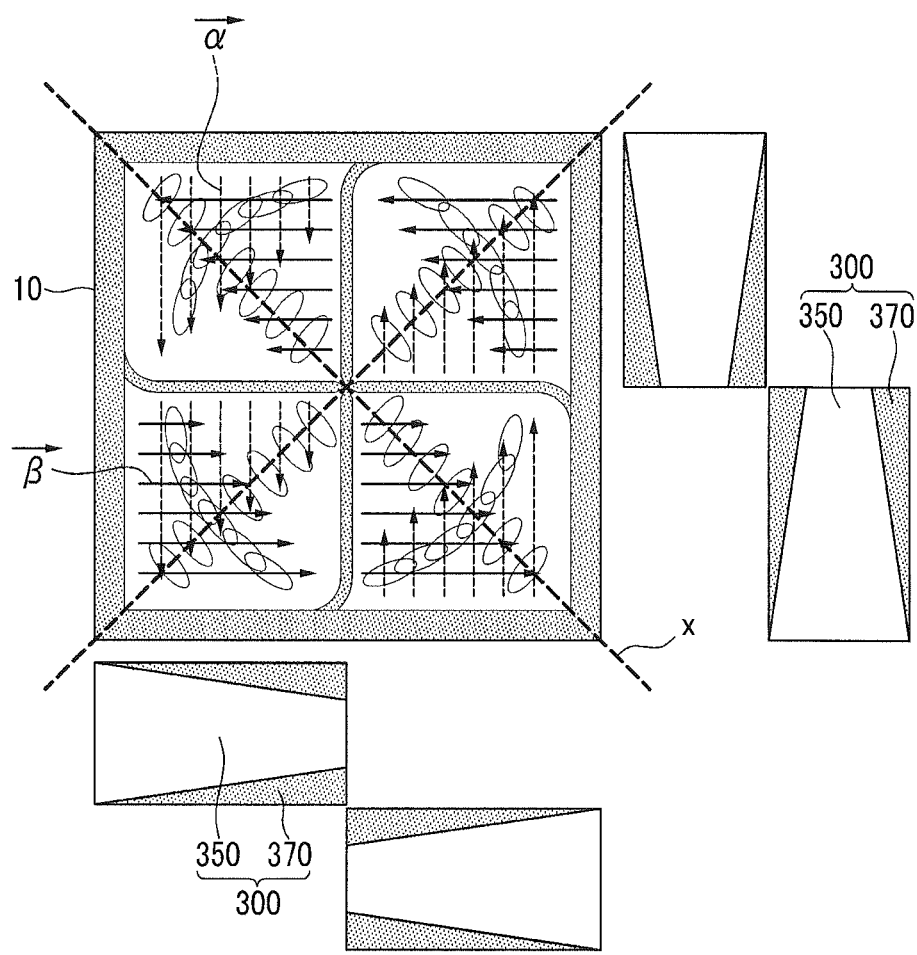
FIGS. 34 and 35 are diagrams showing an exemplary embodiment of a mask and an upper pretilt and a lower pretilt of a liquid crystal display based on the exemplary embodiment of FIG. 33, and liquid crystal azimuth angles of a liquid crystal display as arrows.
Figure 35:
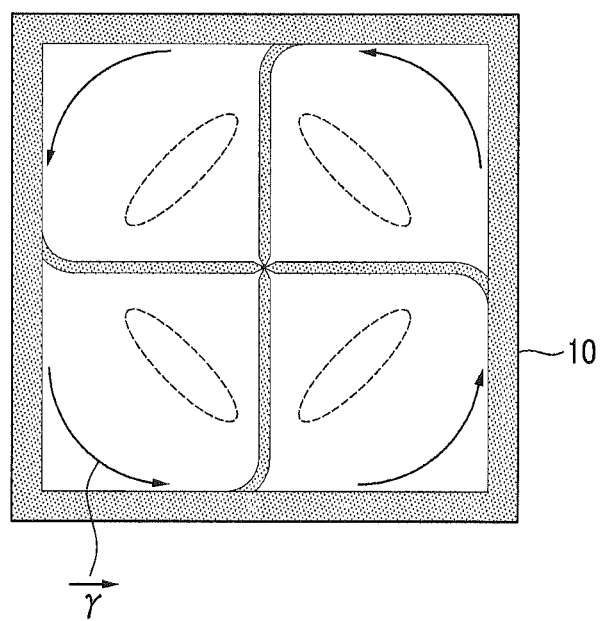
Figure 36:
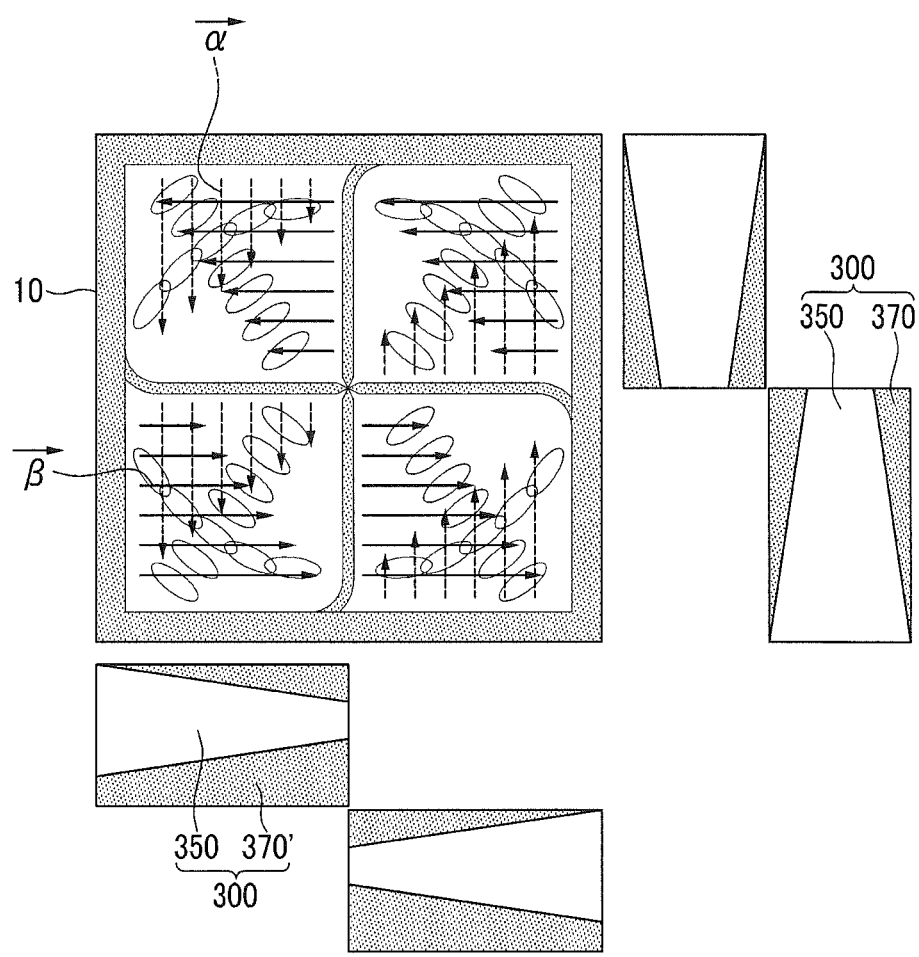
FIGS. 36 and 37 are diagrams showing another exemplary embodiment of a mask and an upper pretilt and a lower pretilt of a liquid crystal display based on the exemplary embodiment of FIG. 33, and liquid crystal azimuth angles of a liquid crystal display as arrows.
Figure 37:
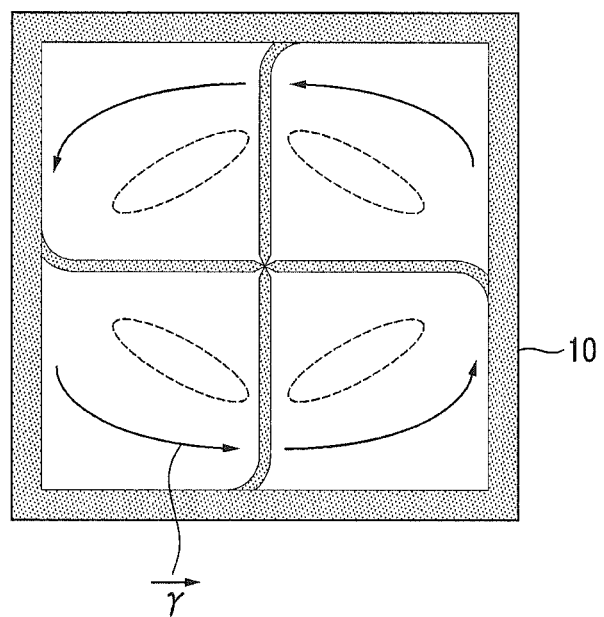

The exemplary embodiment having the pretilt increasing direction as FIG. 33 includes an exemplary embodiment of FIGS. 34 and 35 and an exemplary embodiment of FIGS. 36 and 37.

The exemplary embodiment of FIGS. 34 and 35 will be described.

FIGS. 34 and 35 are diagrams showing an exemplary embodiment of a mask and an upper pretilt and a lower pretilt of a liquid crystal display according to the exemplary embodiment of FIG. 33, and includes arrows indicating connection of liquid crystal molecule azimuth angles in a liquid crystal display as arrows.

In FIG. 34, the lower panel 100 of the liquid crystal display 10 is divided into an upper region and a lower region, and is photo-aligned by using the mask 300 shown at the right side thereof. The upper panel 200 of the liquid crystal display 10 is divided into a left region and a right region and is photo-aligned by using a mask 300 shown below thereof.

In the photo-aligning described above, the upper and lower panels 100 and 200 have an upper pretilt α direction (shown as a dotted line) and a lower pretilt β direction (shown as a solid line) as shown in FIG. 34. An azimuth angle γ of the liquid crystal is represented as FIG. 35.

An arrow of FIG. 35 connects azimuth angles (Azimuth angle) of the liquid crystal molecules to form a curved line having gradually changed angles. In addition, first short-axis directions of the liquid crystal molecules are indicated for every liquid crystal molecule and are connected to each other to form a straight line.

In FIG. 34, when a virtual X line is drawn as shown in FIG. 4, the liquid crystal molecules disposed around the virtual X line have azimuth angles γ in a direction perpendicular to the virtual X line and have a symmetric structure based on the virtual X line. In addition, as shown in FIG. 35, the azimuth angles of the liquid crystal molecules are connected to each other to form a curved line.

Several liquid crystal molecules of the liquid crystal molecules are representatively shown in FIG. 34 and the azimuth angles of the liquid crystal molecules in each region may be verified by the vector-sum of the upper pretilt and the lower pretilt shown in FIG. 34.

In FIGS. 34 and 35, the ranges of the upper pretilt and the lower pretilt are the same as each other, but may be different from each other. This is shown in FIGS. 36 and 37.

FIGS. 36 and 37 are diagrams showing another exemplary embodiment of a mask and an upper pretilt and a lower pretilt of a liquid crystal display according to the exemplary embodiment of FIG. 33, and includes arrows indicting connection of liquid crystal molecule azimuth angles in a liquid crystal display.

In FIG. 36, the mask 300 vertically scanning the upper panel 200 has a relatively wide light shielding region 370' unlike FIG. 34. As a result, an exposure amount decreases and the upper pretilt decreases. Therefore, in the azimuth angles, short-side directional components are relatively small and long-side directional components are large.

In addition, in the alignment of the liquid crystal molecules, an arrow of FIG. 37 connects azimuth angles (Azimuth angle) of liquid crystal molecules to form a curved line having gradually changed angles. In addition, first short-axis directions of the liquid crystal molecules are indicated for every liquid crystal molecule and are connected to each other to form a straight line. The exemplary embodiment of FIGS. 36 and 37 has the alignment structure of the liquid crystal molecules similar to the exemplary embodiment of FIGS. 34 and 35, but has the azimuth angles in which the short-side components decrease and the long-side components relatively increases.

As described above, only the exemplary embodiment in which the lower panel 100 is scan-exposed only in the horizontal direction and the upper panel 200 is scan-exposed only in the vertical direction is shown. However, according to an alternative exemplary embodiment, the lower panel 100 may be scan-exposed in the vertical direction and the upper panel 200 may be scan-exposed in the horizontal direction.

In addition, according to the exemplary embodiments of the invention, the upper pretilt or the lower pretilt is gradually changed and accordingly, the azimuth angles of the liquid crystal molecules are gradually changed in a domain. Since the exemplary embodiments of the invention is directed towards improving side visibility in a liquid crystal display panel, a position in which the upper pretilt, the lower pretilt, and the azimuth angles of the liquid crystal molecules are gradually changed may be a portion of pixel region or display region at which transmitting light is applied to the image being displayed as compared with a portion of the pixel region or the display region at which visibility is deteriorated such as adjacent to a black matrix or a boundary between domains.

Hereinafter, a mask structure of various exemplary embodiments in order to vary an exposure amount every portion will be described.

Figure 38:
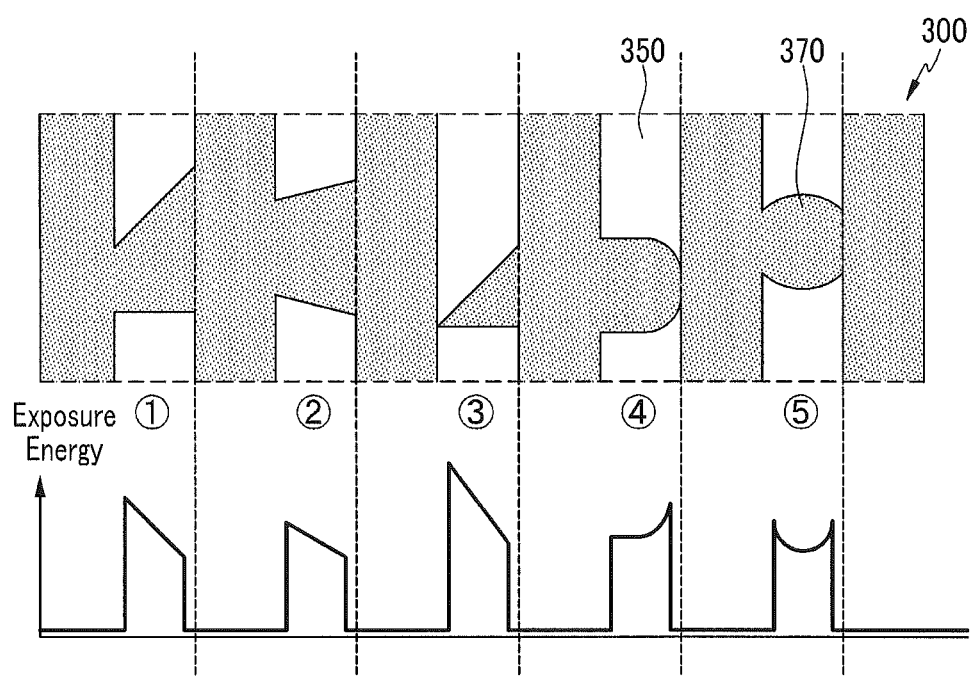
FIGS. 38 and 39 are diagrams showing exemplary embodiments of various masks, according to the invention.
Figure 39:
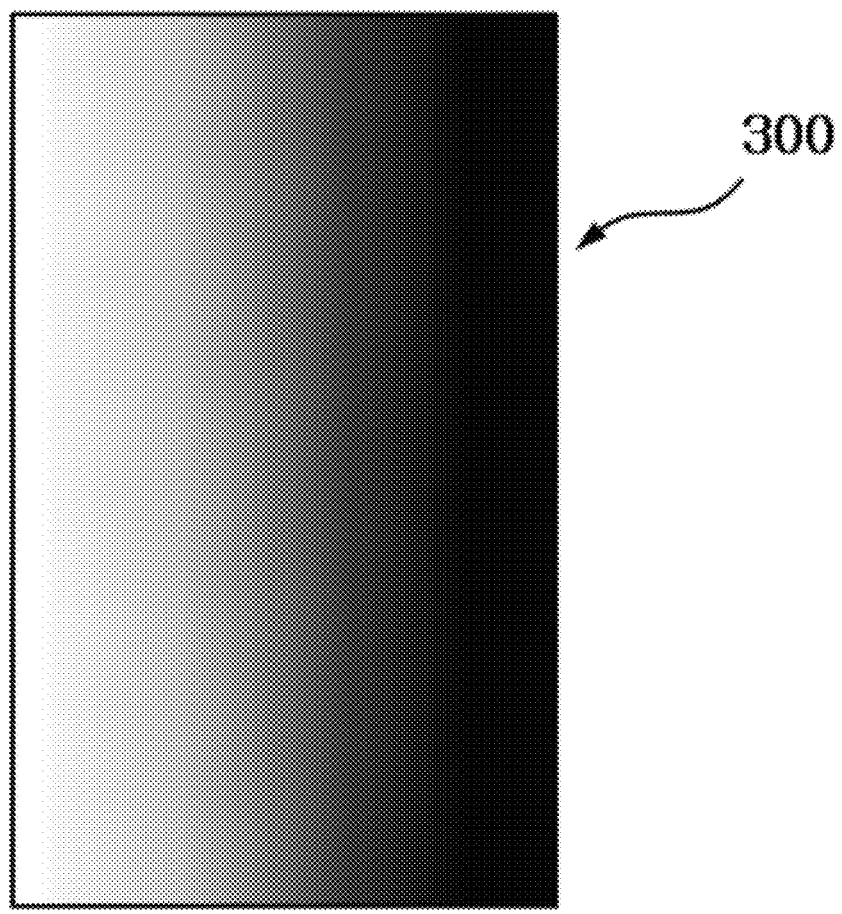

FIGS. 38 and 39 are diagrams showing exemplary embodiments of various masks according to the invention.

FIG. 38 is a diagram comparing the mask 300 used in the scan-exposure and exposure energy thereof as shown in FIGS. 1A to 37 and an exemplary embodiment of a mask used in the scan-exposure in a vertical direction. Only five various masks are shown in FIG. 38. A portion of the various masks includes a light transmitting region 350 which corresponds to an exposure portion, and a portion without the light transmitting region 350 which corresponds to a covered portion in the exposure. That is, when a region of a substrate is divided into right and left regions and the left region is exposed in the vertical scan-exposure, a right region is covered by using a portion without the light transmitting region 350. Thereafter, the left region is covered by using the portion without the light transmitting region 350 while rotating the mask 300 and exposing the right region.

As shown in FIG. 38, in the mask 300, structures and planar shapes of the light shielding region 370 are various. That is, as a mask 1, the light shielding region 370 may have a quadrangular structure in which only one side of the light shielding region 370 is obliquely formed (except for the right and left light shielding region 370 of the mask) and as a mask 2, the light shielding region 370 may have a quadrangular structure in which two sides of the light shielding region 370 are obliquely formed. In addition, as a mask 3, the light shielding region 370 may have a triangular structure, and as masks 4 and 5, the light shielding region 370 may have a curved structure. In the mask 4, exposure energy is equally formed at a predetermined region and the corresponding region may be used in the case where a difference in the exposure amount is not provided. In addition, in the mask 5, the exposure amount is horizontally symmetric based on the center and the mask 5 may be applied to the exemplary embodiment so as to have the exposure amount higher at the center than the right and left.

In addition, according to the exemplary embodiments, the exposure amount may have horizontally asymmetric structure. An interface between the light transmitting region 350 and the light shielding region 370 of the mask 300 is one or more, and a shape thereof may include a linear function, a straight line (including an oblique line), a curved line, a stepwise shape, and the like. In addition, according to the exemplary embodiments, a structure of the light transmitting region 350 or the light shielding region 370 in one mask 300 may be 2 or more and accordingly, a different exposure amount may be provided for each region of the mask.

FIG. 39 shows a structure of an exemplary embodiment of a mask usable to a proxy exposure manner as well as the scan-exposure. In the mask of FIG. 39, the degree of transmitted light is gradually reduced toward one direction of the mask (from left to right in FIG. 39). The mask may be formed by using the light semi-transmitting layer and controlling a semi-transmitting characteristic, such that the degree of the photo-alignment can be controlled.

FIG. 39 shows an exemplary embodiment of a mask in which transmittance of light is reduced in one direction. In particular, a part of the mask of FIG. 38 also corresponds to the case where transmittance of light is reduced along one direction. However, as the mask 5 of FIG. 38, the transmittance of light may be increased and decreased along one direction. As a result, the pretilt formed in at least a partial region may be made not uniform and to gradually change in one domain.

In general, in order to improve side visibility, a method in which one pixel is divided into at least two regions which includes a region displaying a high gray, and a region displaying a low gray, and the gray is recognized by combining the two grays is used.

When the exemplary embodiment of the invention describe above is applied to a part of one pixel, all or at least one of the region displaying the high gray and the region displaying the low gray may be applied.

Figure 40:
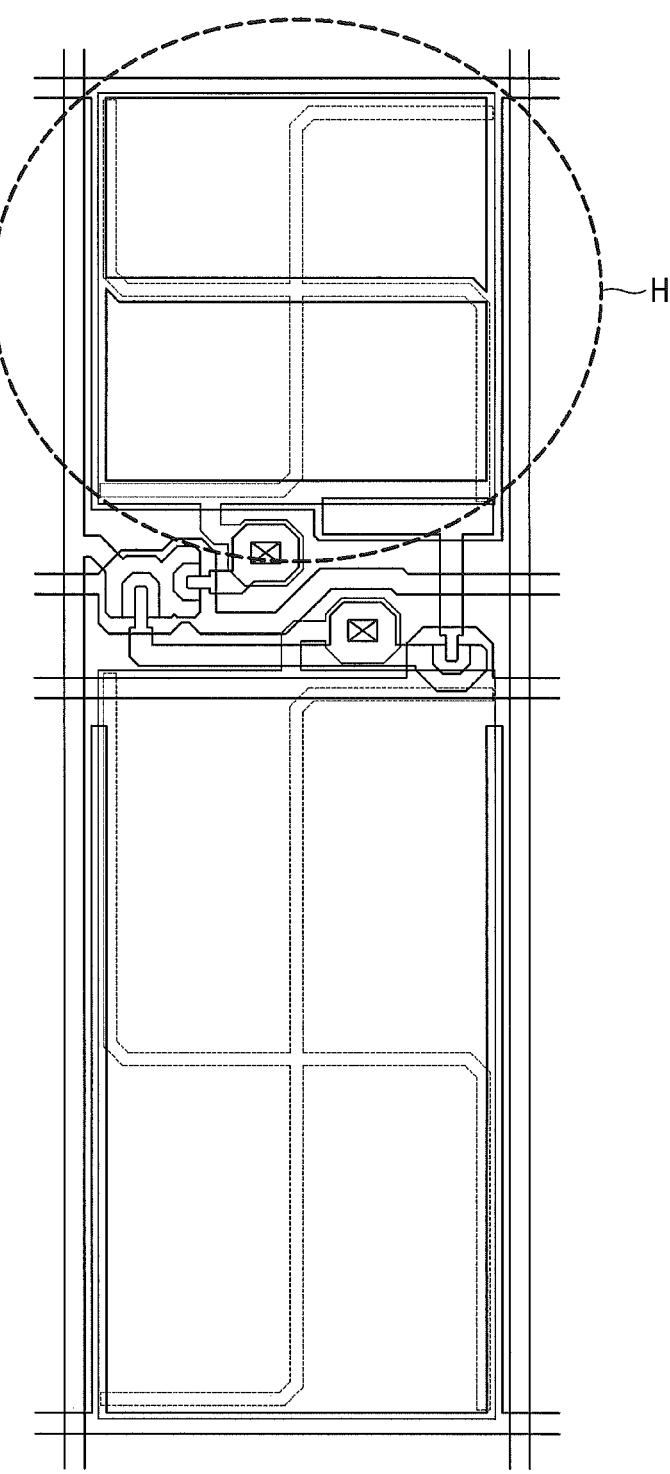
FIGS. 40 to 43 are diagrams showing exemplary embodiments of pixel structures of a liquid crystal display, which can be applied in exemplary embodiments of the invention.
Figure 41:
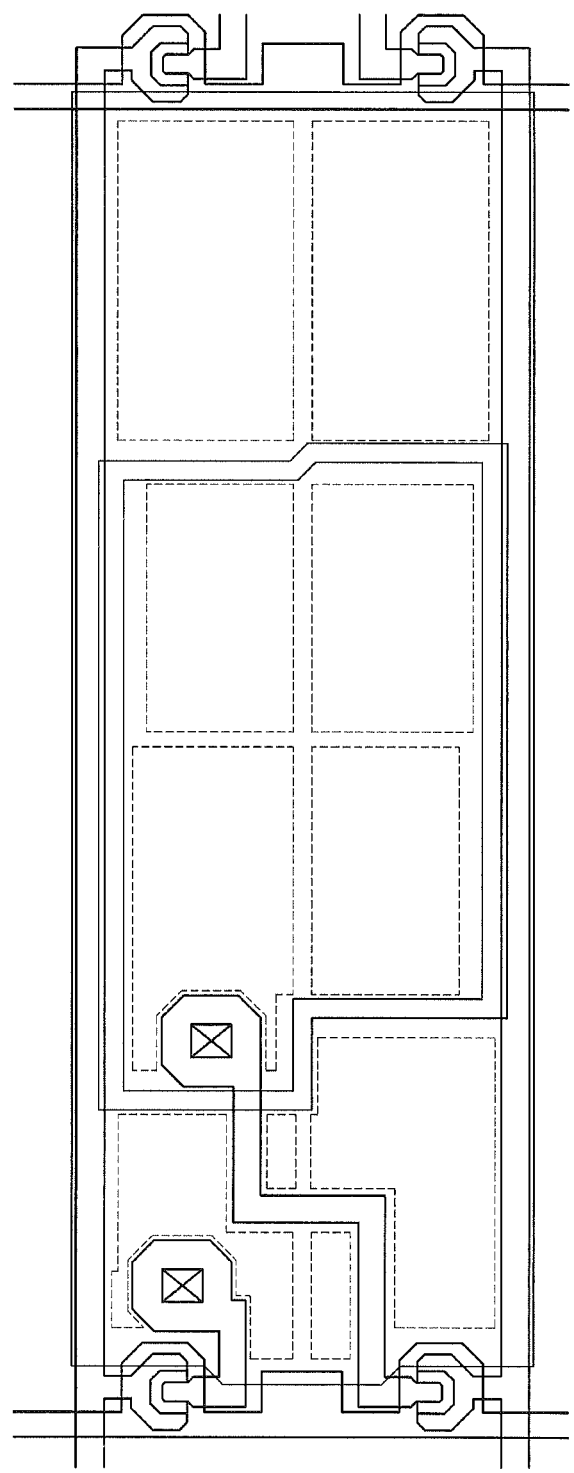
Figure 42:
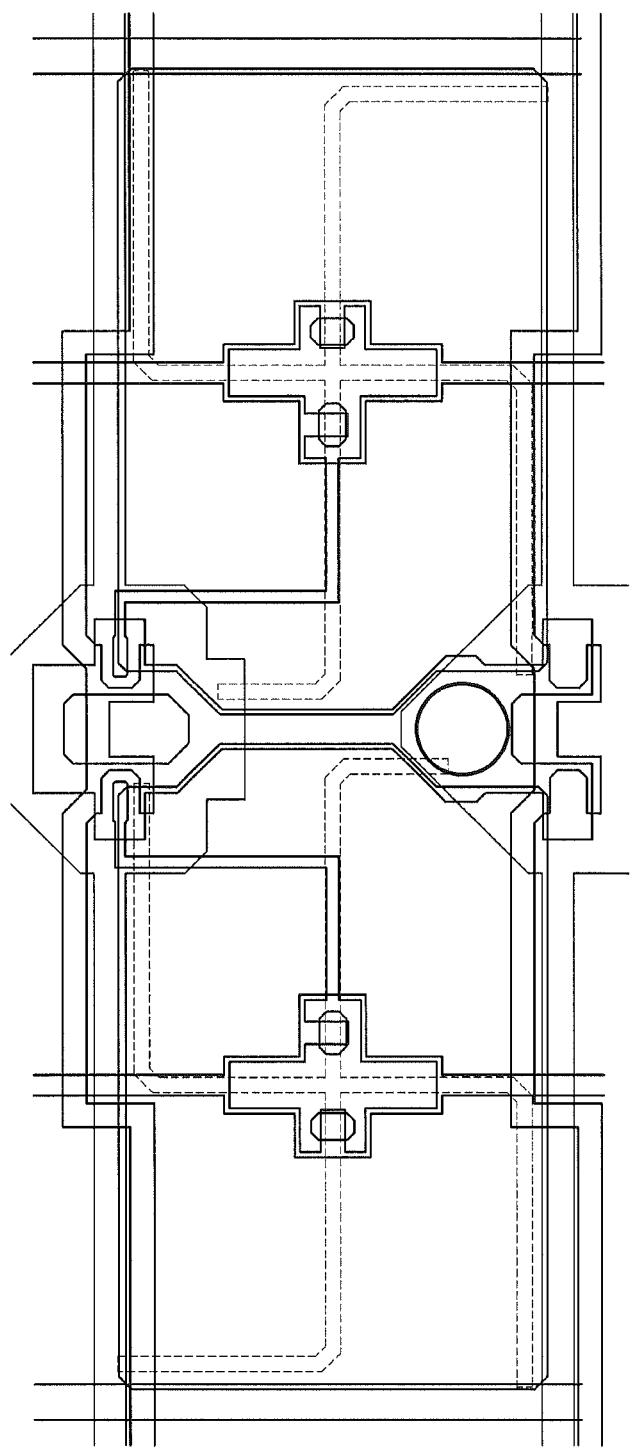

Hereinafter, an exemplary embodiment in which one pixel is divided into a plurality of regions is shown in FIGS. 40 to 42, but is not limited thereto.

FIGS. 40 to 43 are diagrams of exemplary embodiments of pixel structures of a liquid crystal display which can be applied in the invention as several examples. As an exemplary embodiment, the pixel structure may be a structure of the pixel formed on the lower panel.

First, FIG. 40 shows a structure related to a part of the pixel shown in FIGS. 1A to 37. In FIG. 40, a first portion of the pixel represented by H is a portion referred to in FIGS. 1A to 37, and a second portion of the pixel disposed below the first portion may also have a gradually changed azimuth angle by providing a gradually changed pretilt according to the invention. In addition, the ranges of the upper pretilt and the lower pretilt may be different from each other. In the exemplary embodiment of FIG. 40, high gray voltage may be applied to the H portion and low gray voltage may be applied to the portion disposed below the H portion.

In the structure of FIG. 41, four domains disposed directly adjacent to each other at the center of the pixel (central domains), and four domains disposed at the periphery thereof (peripheral domains) form portions of the pixel. At least one of the central domain and four peripheral domains may have a gradually changed azimuth angle by providing a gradually changed pretilt. In addition, the ranges of the upper pretilt and the lower pretilt may be different from each other.

In the structure of FIG. 42, the pixel is divided into an upper portion and a lower portion based on a virtual horizontal line at the center of the pixel, and at least one of the upper portion and the lower portion may have a gradually changed azimuth angle by providing a gradually changed pretilt. In addition, the ranges of the upper pretilt and the lower pretilt may be different from each other.

Figure 43:
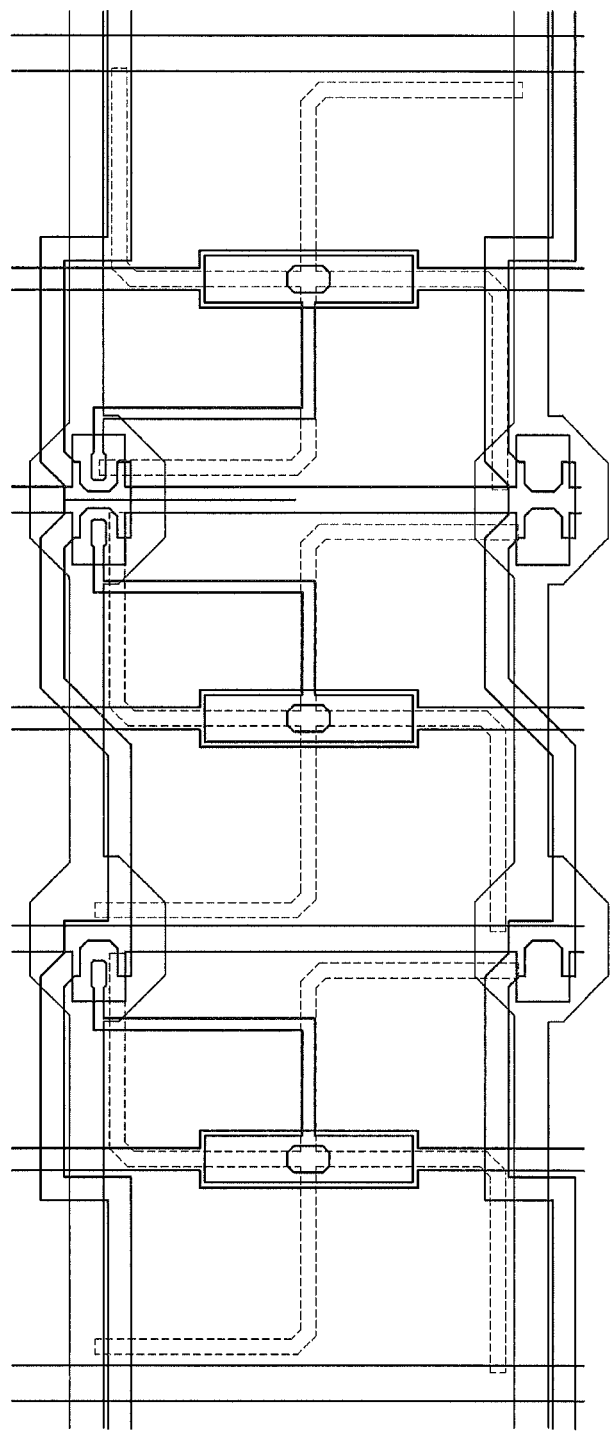

In the structure of FIG. 43, the pixel is divided into total three regions, that is, an upper region, a center region, a lower region. At least one of the three regions may have a gradually changed azimuth angle by providing a gradually changed pretilt. In addition, the ranges of the upper pretilt and the lower pretilt may be different from each other.

The pixel structures of FIGS. 40 to 43 are schematically shown and the pixel structures in which exemplary embodiments of the invention may be applied are exemplified. As shown in the structures of FIGS. 40 to 43, a plurality of regions are formed in one pixel and the exemplary embodiments of the invention may be applied in the pixel in which the plurality of regions are divided into a plurality of domains. In addition, the exemplary embodiment of the invention may be applied even in the pixel structure in which one pixel includes only one region, and the one region includes a plurality of domains.

As described above, the structure in which one pixel is divided into a plurality of regions (subpixels) may be classified based on relationship between the subpixels, and the exemplary embodiments of the invention may be applied even in the structure. Representative structures classified based on the relationship between the subpixels include a charge share structure (a structure in which some charges are leaked or reinforced in some subpixels after applying the same data voltage; see FIG. 40), an independent switch structure (a structure in which a separate voltage is applied to each transistor; see FIG. 41), a common voltage (or storage voltage) swing structure (a structure in which common voltage or storage voltage applied to the pixel is periodically changed; see FIG. 42), and the like.

In addition, one pixel may be divided into two regions, but may be divided into three or more regions (see FIG. 43) or one region and one region may have a square structure or a rectangular structure.

By combining the pixel structures of FIGS. 40 to 43 and the exemplary embodiments of FIGS. 1A to 37, the following contents may be inferred.

In the liquid crystal display, one pixel may include a high gray display subpixel and a low gray display subpixel, and the high gray display subpixel and the low gray display subpixel each may have four domains. In addition, the lower alignment layer and the plurality of liquid crystal molecules adjacent to the lower alignment layer may be arranged by gradually changed pretilts in four domains.

In addition, the azimuth angle directions or the first short-axis directions of the plurality of liquid crystal molecules in each domain are connected to each other to form a curved line and the azimuth angles of the plurality of liquid crystal molecules in the domain may have a fan shape. The azimuth angle directions or the first short-axis directions of the plurality of liquid crystal molecules which are disposed along the center of the fan shape are connected to each other to form a straight line.

In the case where one region is the square structure, the exposure of the scan manner is advantageous to be applied by rotating and using the mask.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a plurality of pixel regions each including a plurality of domains;
a lower panel including a lower substrate, and a lower alignment layer on the lower substrate and including a pretilt;
an upper panel including an upper substrate and an upper alignment layer disposed on the upper substrate and including a pretilt; and
a vertical alignment mode liquid crystal layer between the lower panel and the upper panel, and having a plurality of liquid crystal molecules,
wherein
liquid crystal molecules which are adjacent to the upper alignment layer or the lower alignment layer are arranged by a respective pretilt, and
the pretilt of the lower alignment layer or the upper alignment layer is gradually changed along a first direction from a side to an opposite side in each of the plurality of domains of the plurality of pixel regions in a plan view, and is the same in each of the plurality of domains of the plurality of pixel regions along a second direction perpendicular to the first direction in the plan view.

2. The liquid crystal display of claim 1, wherein:
the liquid crystal molecules adjacent to the lower alignment layer are arranged by a first pretilt in one of the plurality of domains,
the liquid crystal molecules adjacent to the upper alignment layer are arranged by a second pretilt in the one of the plurality of domains, and
the first pretilt is changed within a first range and the second pretilt is changed within a second range.

3. The liquid crystal display of claim 2, wherein:
the first range of the first pretilt and the second range of the second pretilt are the same as each other.

4. The liquid crystal display of claim 3, wherein:
azimuth angle directions or first short-axis directions of the plurality of liquid crystal molecules in the one of the plurality of domains are connected to each other to form a curved line.

5. The liquid crystal display of claim 3, wherein:
an azimuth angle of the plurality of liquid crystal molecules in the one of the plurality of domains has a fan shape.

6. The liquid crystal display of claim 3, wherein:
azimuth angle directions or first short-axis directions of the liquid crystal molecules along the center of the fan shape are arranged in a straight line.

7. The liquid crystal display of claim 6, wherein:
the straight line forms an angle of 45 degrees with one side of the lower substrate or the upper substrate.

8. The liquid crystal display of claim 2, wherein:
the first range of the first pretilt and the second range of the second pretilt are different from each other.

9. The liquid crystal display of claim 8, wherein:
azimuth angle directions or first short-axis directions of the plurality of liquid crystal molecules in the one of the plurality of domains are arranged in a curved line.

10. The liquid crystal display of claim 8, wherein:
an azimuth angle of the plurality of liquid crystal molecules in the one of the plurality of domains has a fan shape.

11. The liquid crystal display of claim 8, wherein:
azimuth angle directions or first short-axis directions of the liquid crystal molecules along the center of the fan shape are arranged in a straight line.

12. The liquid crystal display of claim 1, further comprising:
a pixel includes a high gray display subpixel and a low gray display subpixel,
wherein
the high gray display subpixel and the low gray display subpixel, each has four domains, and
the plurality of liquid crystal molecules adjacent to the lower alignment layer and the lower alignment layer in the four domains are respectively arranged by the gradually changed pretilt.

13. The liquid crystal display of claim 12, wherein:
azimuth angle directions or first short-axis directions of the plurality of liquid crystal molecules in each of the domains are arranged in a curved line.

14. The liquid crystal display of claim 12, wherein:
an azimuth angle of the plurality of liquid crystal molecules in each of the domains has a fan shape.

15. The liquid crystal display of claim 12, wherein:
azimuth angle directions or first short-axis directions of the liquid crystal molecules along the center of the fan shape are arranged in a straight line.

* * * * *